United States Patent
Kundu

(10) Patent No.: US 12,506,868 B2
(45) Date of Patent: Dec. 23, 2025

(54) ADAPTIVE IMAGE COMPRESSION FOR CONNECTED VEHICLES

(71) Applicant: Hitachi, Ltd., Tokyo (JP)

(72) Inventor: Subrata Kumar Kundu, Canton, MI (US)

(73) Assignee: HITACHI, LTD., Tokyo (JP)

( * ) Notice: Subject to any disclaimer, the term of this patent is extended or adjusted under 35 U.S.C. 154(b) by 234 days.

(21) Appl. No.: 18/207,238

(22) Filed: Jun. 8, 2023

(65) Prior Publication Data

US 2024/0414337 A1 Dec. 12, 2024

(51) Int. Cl.
| | |
|---|---|
| H04N 19/12 | (2014.01) |
| B60W 60/00 | (2020.01) |
| G06V 10/94 | (2022.01) |
| G06V 20/58 | (2022.01) |
| H04N 7/18 | (2006.01) |
| H04N 19/20 | (2014.01) |

(52) U.S. Cl.
CPC ........... *H04N 19/12* (2014.11); *B60W 60/001* (2020.02); *G06V 10/95* (2022.01); *G06V 20/58* (2022.01); *H04N 7/181* (2013.01); *H04N 19/20* (2014.11); *B60W 2420/403* (2013.01); *B60W 2556/10* (2020.02); *B60W 2556/45* (2020.02)

(58) Field of Classification Search
CPC ...... H04N 7/181; H04N 13/139; H04N 19/12; H04N 19/127; H04N 19/156; H04N 19/167; H04N 19/20; H04N 19/463; G06V 10/22; G06V 10/25; G06V 10/95; G06V 20/56; G06V 20/58; B60W 2050/0002; B60W 60/001; B60W 2420/40; B60W 2420/403; B60W 2556/10; B60W 2556/45

See application file for complete search history.

(56) References Cited

U.S. PATENT DOCUMENTS

| | | | |
|---|---|---|---|
| 6,891,973 B1 * | 5/2005 | Atsumi | H04N 19/647 375/E7.146 |
| 11,546,503 B1 | 1/2023 | Kundu et al. | |
| 2010/0239016 A1 * | 9/2010 | Desimone | G06V 40/20 375/E7.076 |
| 2011/0267452 A1 * | 11/2011 | Notsu | H04N 19/115 382/104 |
| 2016/0283804 A1 * | 9/2016 | Furman | G01C 21/30 |
| 2020/0348665 A1 * | 11/2020 | Bhanushali | H04N 19/167 |
| 2021/0370925 A1 * | 12/2021 | Janssen | B60W 30/09 |
| 2022/0116052 A1 * | 4/2022 | Silberman | G05D 1/81 |
| 2023/0080281 A1 | 3/2023 | Kundu et al. | |

* cited by examiner

*Primary Examiner* — Brandon Z Willis
(74) *Attorney, Agent, or Firm* — MATTINGLY & MALUR, PC

(57) ABSTRACT

In some examples, a system may determine a plurality of candidate routes to a destination location for a vehicle, and may segment each candidate route into multiple road segments. The system determines one or more compression methods to be utilized for compressing images captured by one or more vehicle cameras on board the vehicle while the vehicle is traversing at least one road segment of at least one route of the plurality of candidate routes. The system selects, for the vehicle, a first route based at least on the one or more compression methods. The system sends, to the vehicle, information related to the first route and the one or more compression methods. The vehicle may utilize the one or more compression methods for compressing the images captured by the one or more vehicle cameras during traversal of the first route.

20 Claims, 17 Drawing Sheets

ADAPTIVE IMAGE COMPRESSION FOR CONNECTED VEHICLES

BACKGROUND

Advanced driver assistance systems (ADAS) and autonomous driving (AD) systems are systems that automate or otherwise enhance vehicle control for improved safety, automated navigation, improved convenience, improved efficiency, and the like. In some cases, these vehicles may communicate with computing devices external to the vehicle. Such connected automated vehicles (CAVs) are gaining wide acceptance and are expected to play a major role in future mobility ecosystems. Ensuring the safety and reliability of a CAV may be dependent, in part, on the quality of vehicle sensor data that the vehicle is able process, such as for determining an action to be taken by the vehicle. As one example, cameras are widely used for efficient and safe operation of automated vehicles. However, cameras can often generate huge amounts of data that may be difficult to process in real-time using conventional processors typically installed on board such vehicles.

SUMMARY

In some implementations, a system may determine a plurality of candidate routes to a destination location for a vehicle, and may segment each candidate route into multiple road segments. The system determines one or more compression methods to be utilized for compressing images captured by one or more vehicle cameras on board the vehicle while the vehicle is traversing at least one road segment of at least one route of the plurality of candidate routes. The system selects, for the vehicle, a first route based at least on the one or more compression methods. The system sends, to the vehicle, information related to the first route and the one or more compression methods. The vehicle may utilize the one or more compression methods for compressing the images captured by the one or more vehicle cameras during traversal of the first route.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
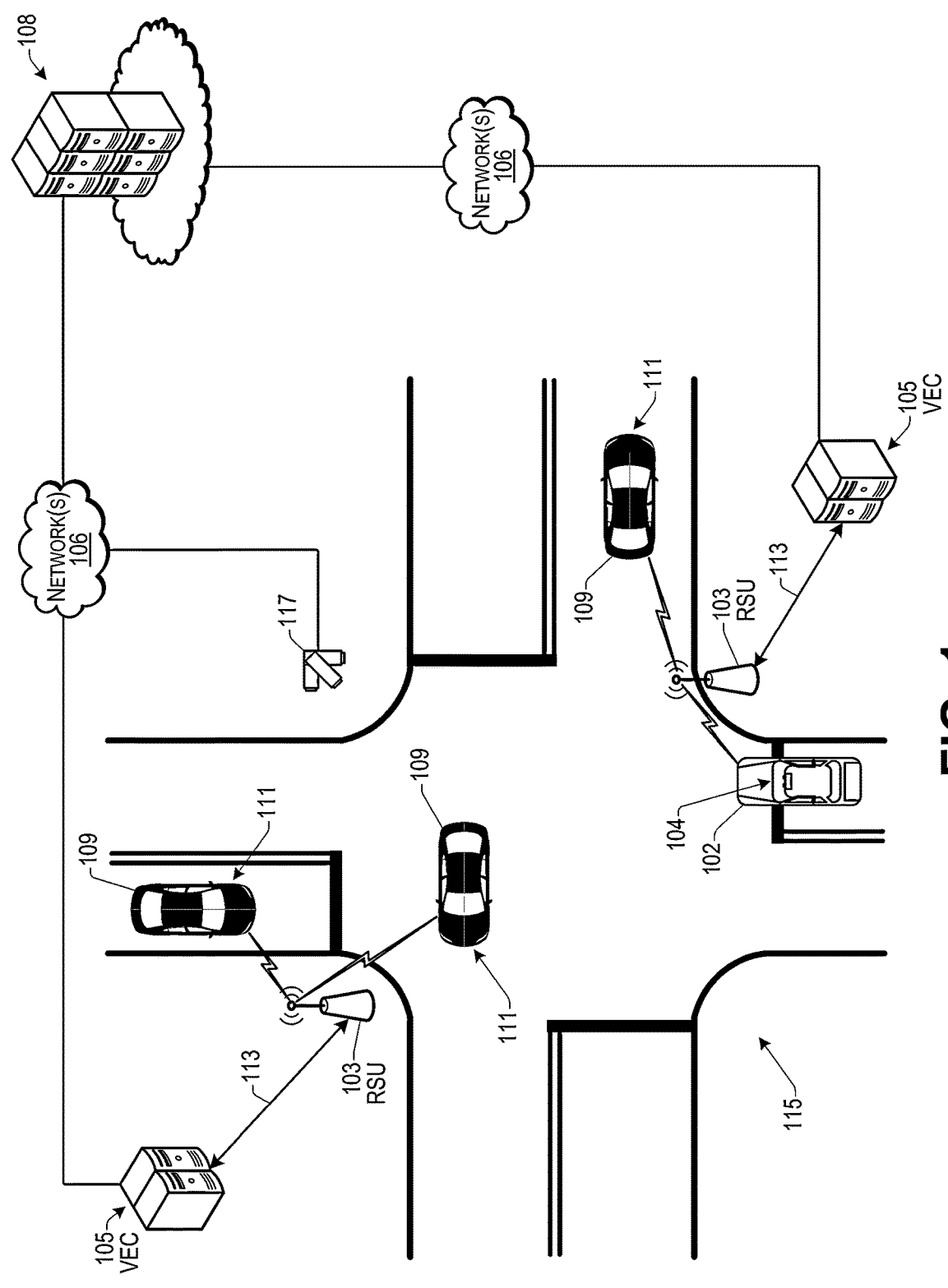
FIG. 1 illustrates an example system for adaptive image compression for a vehicle according to some implementations.

Some implementations herein are directed to techniques and arrangements for adaptively selecting a compression method to apply to images captured by one or more of the cameras onboard a vehicle. For example, the compression of images captured by each vehicle camera may be adaptively optimized by using different compression methods for different cameras based at least on information related to the route to be traversed by the vehicle. In some cases, the determination of the compression methods may be based on determining precautionary observation zones (POZs) along the route and/or automated vehicle disengagement history information for the route. As one example, based on the location of the cameras on the vehicle, the camera capabilities, and target functionalities of the respective cameras, such as for recognizing different obstacles and road features along the route, optimization of image compression of images from different cameras on the vehicle may be managed based on an upcoming action of the vehicle to ensure correct recognition results from the captured images. Accordingly, examples herein are able to adaptively allocate processing resources to the images captured by cameras that are expected to detect higher priority areas than those cameras whose images are determined to be lower priority for the particular action being performed by the vehicle during navigation of a particular portion of the route. This enables the examples herein to provide significant benefits for vehicle safety and reliable operation.

The automated vehicles herein may typically employ single or multiple mono cameras, stereo cameras, and/or thermal cameras to monitor the area around the vehicle for enabling the vehicle to perform automated driving functions based on its level of automated driving capability. These cameras may generate a huge amount of data. A significant limitation to realizing automated driving functions is the requirement of processing the large amount of data received from the cameras and other sensors in real-time using automotive grade electronic control units (ECUs) or an AD/ADAS ECU. The adaptive image compression techniques herein may be employed to reduce the amount of data that is processed by the vehicle ECUs which enables the data to be processed more quickly, thereby improving vehicle safety and the reliability of vehicle operation.

There are a number of image compression techniques available that can be generally classified as either lossy compression or lossless compression. A high-level lossy compression method may reduce the image size significantly; however, a recognition model may have greater difficulty in correctly recognizing all the obstacles and road features when a high-level lossy compression method is used. On the other hand, a lossless compressed image may ensure better recognition results; however, the image size may be considerably larger than that of an image compressed using a lossy compression method. Thus it is difficult to utilize only one image compression technique while also ensuring the best result in all scenarios. Consequently, implementations herein apply an adaptive image compression technique that enables more efficient image processing without compromising vehicle safety. The adaptive image compression technique includes the use of precautionary observation zone (POZs) and automated vehicle disengagement history information to adaptively define the best image compression technique to apply to respective cameras of connected automated vehicles at any point along a route that the vehicle is traversing. The techniques herein may include determining the regions of interest where one or more corresponding vehicle cameras should monitor based on the location of the cameras on the vehicle, as well as prioritizing the obstacles or road features that should be recognized with higher accuracy.

Some implementations herein may take into consideration information obtained from an automated vehicle disengagement history database that may include information about intersections at which automated vehicles have disengaged from automated operation based on the occurrence of a problem, or the like, during automated vehicle testing. For example, a vehicle may be located at a particular intersection and may disengage due to a recognition failure. For example, a recognition failure indicates that the vehicle's cameras are unable to detect a pedestrian, a landmark, a traffic light, or the like. The disengagement may have been performed by the vehicle or by the vehicle occupant. Information related to vehicle disengagement and the cause of the disengagement may be stored in a database that is accessible by the system herein. Accordingly, at such intersections where disengagement has occurred there may be a requirement for a higher degree of detection than at other intersections at which disengagement has not occurred. As one example, if previous history shows that automated vehicle disengagement occurred at a particular intersection due to traffic light recognition failure, then the system herein may set traffic light recognition as a higher or highest priority critical target for the intersection, and the vehicle camera that is used to detect the traffic light may be designated to have a lower level of image compression, such as lossless compression, while the vehicle is traversing the particular intersection. Consequently, some implementations herein may employ both the determination of precautionary observation zones along a route and the disengagement history of automated vehicles along the route when determining a level of compression to be applied to particular cameras onboard the vehicle at various different locations along the route.

The examples herein may also determine how to efficiently utilize other available computing resources to perform the necessary processing tasks, such as by using vehicular edge controllers (VECs) where available, and through communication with a central data management platform. The examples herein may determine a region of interest at locations along the route, and where particular ones of the vehicle cameras should monitor based on the camera locations on the vehicle. The examples herein may also prioritize or otherwise rank the obstacles or road features that should be recognized with higher accuracy, and may determine a corresponding resource allocation strategy.

There are different kinds of sensing techniques or sensors used for automated driving (AD) and/or ADAS applications. Commonly used sensors include mono camera, stereo camera, infrared camera, radar, lidar, laser, ultrasonic sensors, GPS, compass, IMU, etc. For any specific driver assistance system application or any specific level of automated driving, sensors may be selected considering their advantages and disadvantages including range of motion, type of detection ability, power requirement, cost, amount of data generation, etc. Generally, level-1 and/or level-2 automated vehicle functions (like adaptive cruise control-ACC) could be realized using a standalone sensor like mono or stereo camera, or a combination of a camera and radar. Multiple sensors are mostly required to realize a higher level of automated driving like level-3 to level-5. For a fully automated vehicle, such as level-4 and level-5, it is essential to continuously monitor 360 degrees around the vehicle to avoid any obstacles and navigate safely which requires multiple sensors to work together. Each sensor has its own advantages and disadvantages. For instance, it would be difficult to use a single sensor that would be able to meet all weather requirements considering recognition accuracy and range. Thus, automotive manufacturers use sensor fusion systems based on the level of autonomous driving of the vehicle, as well as the cost of the overall system.

Examples herein may include determining compression method for a vehicle to use for various onboard cameras during traversal of a route. In some cases, the determining of the compression method may include determining precautionary observation zones (POZs) and/or past automated vehicle disengagement events that may be used for determining an optimal route for a vehicle. The determination of the POZ may take into consideration the types, capabilities, and fields of view (FOVs) of onboard cameras, as well as those of other sensors employed on the vehicle when selecting the optimal route, and may further take into consideration road features on each candidate route, the FOV necessary for navigating each candidate route, as well as other considerations, as discussed below.

In some cases, the compression method to be employed for images captured by individual cameras of a plurality of cameras onboard the vehicle at each location along a route may be determined in advance before the vehicle begins traversing the route. Thus, the system may provide the vehicle with a selected route and the compression method to be used for each camera during each segment or other portion of the route. The vehicle computing device may apply these compression methods based on current location information as the vehicle travels along the selected route. Alternatively, in other examples, such as in the case that the vehicle deviates from the selected route, the vehicle may receive the compression methods for the respective vehicle cameras in real time from the service computing devices based on the current vehicle location.

In some examples, the system herein may offload computational tasks, including a portion of the image compression tasks, to one or more vehicular edge computing devices (VECs) that are located near the route and that are able to communicate with nearby vehicles through one or more roadside units (RSUs). For instance, in contrast to communications with computing devices at data centers or other cloud infrastructure locations, the VECs herein may be better positioned to execute time-critical computational tasks due to the closer location of these processing units to the roadside, as compared to the relatively remote location of cloud-based servers. For example, VECs may avoid or substantially reduce the network latency of data communications between the vehicle and off-vehicle computing devices. Furthermore, other vehicles with available sensing and computational resources that are near a VEC may provide the sensing and/or computational resources to the VEC to also process and/or provide data to the vehicle. For instance, in some examples, images from an infrastructure camera at a fixed location, or recognition results therefrom, may be provided by the VEC to the vehicle for aiding the vehicle in navigating the corresponding location.

Examples herein may provide a combination of VECs, other vehicles with excess computational capacity, and more remotely located cloud-based service computing devices, which separately and/or together may provide sensing and computation resources to respective vehicles in need of additional computational resources, while the respective vehicles also perform onboard processing using their own electronic control units (ECUs) and their own onboard sensors. Accordingly, the examples herein may determine in advance where to request that a nearby VEC provide support with computational tasks for a vehicle that is not able to fully perform the necessary computations for traversing one or more road segments. For example, the remotely located service computing devices may assign the computational task to a nearby VEC according to the available computation resources on the VEC. Implementations herein may further identify certain regions along the route in advance as POZs, which are locations that may require higher levels of computational resources to realize autonomous driving. The system may perform scheduling for assigning and executing the offloaded computational tasks accordingly by scheduling available computation resources of the VECs and/or the cloud-based service computing devices.

To ensure vehicle safety, some examples herein may try to maximize the amount of automated driving time. For example, safe driving is not only important for individuals but also for any type of transportation or service business. Safety is one of the underlying reasons for wider development and rapid progress of automated driving systems. Fully or partially automated vehicles are equipped with multiple sensors to continuously monitor the vehicle surroundings to recognize obstacles for improving safety. Studies show that most road accidents are caused due to human driver errors. Thus, state of the art automated vehicles equipped with advanced sensing and data processing units may enable the use of improved algorithms to significantly reduce the incidence of vehicle collisions.

The cameras and other sensors of the automated vehicles herein may play a major role in detecting obstacles around the vehicles and road features to ultimately help avoid collisions. The processing units herein may process the camera images and other sensor data in real time and may send necessary control signals to various systems and/or actuators to control the vehicle. By deploying multiple redundant cameras and other high-resolution sensors around the vehicle in conjunction with use of multiple processing units with high processing capacity, a vehicle may be able to operate autonomously in all conditions. However, such a configuration not only increases the cost of the vehicle substantially, but can also reduce the vehicle efficiency. Accordingly, to address these issues, implementations herein may use a more limited number of cameras and other sensors and processing units with optimized processing capacities. Further, some implementations herein may employ VECs to augment the processing capabilities of a vehicle at these locations.

In some examples herein, at the beginning of a trip, the vehicle may share its current location, destination, camera configuration information, and other sensor types and configuration, and processing unit specifications with the service computing devices. The service computing devices identify candidate routes to the destination, may calculate POZs for the candidate routes, and may check the candidate routes for prior occurrences of automated vehicle disengagement. The POZ may be a region that a vehicle should monitor to ensure safety of the vehicle. Further, based on the POZs and the occurrences of automated vehicle disengagement, the system may identify critical targets at least at some locations, and may prioritize or otherwise rank these critical targets, such as based on relative impact on vehicle safety if a critical target is not recognized in a timely manner. POZs may be determined for all the road segments and/or waypoints along the route. In some cases, a POZ may be a 3D region that varies depending e.g., the road type, waypoint locations, etc., as discussed additionally below.

The service computing devices may analyze vehicle camera configuration in comparison with the POZs identified along all the candidate road segments, and select the optimal route for maximizing the amount of time for automated driving. Based on the vehicle sensor configuration and vehicle processing unit specifications, the service computing devices may identify the road segments along the route where the vehicle requires additional computational resources to analyze sensor data, such as for identifying road features and obstacles for automated driving. The service computing devices share the vehicle information with the VECs in the identified locations and the expected time at which the vehicle is expected to approach the road segment nearest to the respective VEC. Upon receiving the vehicle information from the service computing devices, the respective VEC may analyze the scheduled computing tasks for that time segment, and based on the computing resource availability of the respective VEC, may confirm or reject the request to support the particular vehicle. Additionally, based on the feedback from the respective VECs, the service computing devices may update the routing information and may send the routing information to the vehicle. For instance, if a VEC is not able to support the request for the particular vehicle, the service computing devices may determine whether an alternative candidate route may be available for the vehicle.

In some examples, the vehicle may access a connected data analytics platform provided by the service computing devices and may provide information to the data analytics platform regarding the onboard cameras and other sensors available on the vehicle, as well as providing a source location, a destination location, vehicle configuration information, and so forth. Further, the vehicle may receive, from the data analytics platform, information about one or more optimal routes selected by the data analytics platform for reaching the destination location and the compression method to use for each onboard camera along each segment of the route. Alternatively, in other examples, the route determination and compression methods to use may be performed by a computing device onboard the vehicle, or by a VEC located proximate to the vehicle, along a route of the vehicle, or the like.

As one example, the POZ for a road segment may be determined using a camera-based driver monitoring system and data collected from monitoring a number of subjects. However, some examples herein include techniques for determining POZs by identifying the required observation zones for a route without prior subject-based driver monitoring data. In these techniques, a fully automated/semi-automated vehicle may communicate with a data analytics platform provided by the service computing devices that may determine a plurality of candidate destination routes, such as by using a conventional routing engine. In the data analytics platform, potential routes are divided into multiple road segments and each road segment is categorized as to whether it is a part of an intersection functional area or not. Based on the category of the selected road segment, multiple parameters including stopping sight distance, perception reaction distance, maneuver distance, turn sight distance, etc., are calculated which are ultimately used to calculate the POZ for that road segment.

For discussion purposes, some example implementations are described in the environment of determining a plurality of different compression methods to apply to images from a plurality of different cameras onboard a vehicle, such as based on the determination of one or more POZs and further based on historical vehicle disengagement information. However, implementations herein are not limited to the particular examples provided, and may be extended to other types of vehicles, other types of communications, other types of computing device configurations, other types of computing platforms and architectures, and so forth, as will be apparent to those of skill in the art in light of the disclosure herein.

FIG. 1 illustrates an example system 100 for adaptive image compression for a vehicle according to some implementations. In this example, at least three different types of computational resources may be employed. The system 100 includes a vehicle 102 having one or more vehicle computing devices 104 able to communicate wirelessly with one or more roadside units (RSUs) 103 that are connected to one or more VECs 105. In addition, the vehicle computing devices 104 and the VECs 105 are able to communicate over one or more networks 106 with one or more service computing devices 108. The VECs 105 may also communicate with a plurality of other vehicles 109, each of which may also include its own vehicle computing device 111. In some examples herein, the vehicles 102, 109 may be referred to as "connected vehicles" since they are connected for communication with one or more off-vehicle computing devices, such as the VECs 105 and/or the service computing devices 108.

As several non-limiting examples, the VECs 105 may be near to a road segment, such as by being located within a mile, a half mile, a quarter mile, or less from one or more of the road segments traversed by the vehicles 102, 109, and to which the VECs 105 may provide information, recognition data, or other results of processing camera or other sensor data, such as from cameras and other sensors external to (i.e., not on board) the vehicle 102. For instance, in some cases, the VECs 105 may be located within several hundred yards of the RSUs 103 to which they are connected, and the RSUs 103 may be located within several dozen yards of the roads on which the vehicles 102, 109 travel. Conversely, the service computing devices 108 may be located dozens, hundreds, or even thousands of miles from the RSUs 103, the vehicles 102, 109, and the VECs 105.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH® or DSRC (dedicated short-range communications); a wired network, including fiber optics and Ethernet; any combination of the foregoing, or any other suitable communication network. Components used for such communication technologies can depend at least in part upon the type of network, the environment selected, or both. Protocols for communicating over such networks are well known and will not be discussed herein in detail.

Additionally, communication links 113 between the RSUs 103 and the VECs 105 may include any of the one or more networks 106. For example, the VECs 105 and the RSUs 103 may communicate through wireless or wired communications. In some cases, the communication links 113 may include an optical fiber connection, Ethernet, or other wired connections. Further, the RSUs 103 may be configured to communicate wirelessly with the vehicles 102, 109, such as through any type of wireless communications. Examples include 4G, 5G, or LTE cellular communications, other radio frequencies, Wi-Fi communications, V2X, other short range radio communications, or any other wireless communication technology.

In some examples, the vehicle computing devices 104, 111, may include one or more electronic control units (ECUs) or any of various other types of computing devices. For instance, the computing devices 104, 111 may include one or more ADAS/AD ECUs or other types of ECUs for processing sensor data and for controlling at least some of the vehicle systems, such as to perform ADAS and/or AD tasks, such as navigation, braking, steering, acceleration, deceleration, and so forth. The computing devices 104, 111 may also include one or more other ECUs, such as for controlling any of numerous other systems of the vehicles 102, 109, respectively.

In the illustrated example, an intersection 115 includes multiple RSUs 103 able to communicate with the vehicles 102, 109. For instance, suppose that a data analytics platform implemented by the service computing devices 108 has identified the intersection 115 as a POZ at which the vehicle 102 may require additional computational resources for navigating. In addition, there may be one or more infrastructure sensors 117 located at the intersection 115, such as traffic cameras, or any of various other types of sensors.

Accordingly, a portion of the computational tasks to enable the vehicle 102 to navigate the intersection 115 autonomously may be offloaded to one of the VECs 105 that are located proximate to the intersection 115 and able to communicate with the RSUs 103, respectively. For example, infrastructure sensor data, data from other vehicles 109, and/or data from the vehicle 102 may be received by the VEC 105. The VEC 105 may perform one or more computational tasks on behalf of the vehicle 102, and may send the results of the processing to the vehicle 102 through the RSU 103. In some cases, the vehicle 102 may use the results provided by the VEC 105 during navigation of the intersection 115. As one example, the VEC 105 may compensate for limited processing capability and/or limited sensor capabilities of the vehicle 102 by augmenting the information available to the vehicle 102 with sensor information and/or recognition information from the infrastructure sensors 117 and/or sensors of other vehicles 109.

As one example, at the beginning of a trip, the vehicle 102 may share its destination with the one or more service computing devices 108. Based on the destination, the service computing device 108 may select an optimal route, as discussed additionally below, and which may include determining the individual route segments of the optimal route. Further, based at least on considering live and historic traffic data, the service computing device 108 may determine the time at which the vehicle is expected to reach each route segment. For example, in the case of intersection 115, the service computing device 108 may determine the time at which the vehicle 102 is expected to be approaching the intersection. The service computing device 108 sends the vehicle information for the vehicle 102 along with the expected intersection arrival time to one or more of the VECs 105 associated with the intersection 115. Based on this received information, the VEC 105 schedules the vehicle 102 to be served at the expected time.

In some examples herein, each VEC 105 (and its corresponding RSU(s) 103) may have respective defined work zones (e.g., in a diameter thereabout, or the like) and which may range from meters to kilometers. The VEC 105 may support the vehicles within its work zone. Thus, when the vehicle 102 enters into the working zone of any VEC 105 and/or its corresponding RSU 103, the vehicle 102 may sends its location and other vehicle information to the VEC 105 through the RSU 103, such as using any suitable communication protocol, e.g., cellular-V2X, WiFi, or any other wireless communication technology, examples of which listed elsewhere herein. Thus, the vehicle 102 and the VEC 105 are able to establish communication through the RSU 103, and the VEC 105 is able to recognize the particular vehicle 102, such as through the vehicle information previously received from the service computing device 108. Based on recognizing the particular vehicle 102, the VEC 105 is able to provide the sensing and/or computational support that may have been specified by the service computing device 108 with the vehicle information provided to the VEC 105.

Furthermore, in some examples, the VEC 105 may utilize data from one or more of the vehicle computing devices 111 on one of the other vehicles 109 and/or sensors on the other vehicles 109 for performing the computational tasks, such as for providing additional sensor recognition information to the vehicle 102. For instance, some of the vehicles 109 may have an overcapacity of computational processing resources. In this situation, the VEC 105 may itself offload one or more computational tasks to a vehicle 109 that has available computing capacity, receive the results back, and provide the results to the vehicle 102.

Additionally, in some examples, the service computing devices 108 may also provide computing resources to the vehicle 102, such as for computational tasks that are not time-critical. Since the VEC resources are typically located at substantially closer distance to the vehicles 102, 109 as compared to the service computing devices 108, execution of off-loaded time-critical safety and control applications may be performed typically in the VEC 105, rather than at the service computing devices 108, which may be physically located at a data center hundreds or thousands of miles away. Further, while RSUs 103 illustrated in the example of FIG. 1 are shown as being separate from the VECs 105, in other examples, the RSU 103 and VEC 105 may be combined into a single computing device able to send/receive data to/from the vehicles 102, 109, as well as to process the data. Further, as discussed below, the service computing devices 108 may provide numerous other functions for aiding the vehicles 102, 109 in autonomous navigation.

Figure 2B:
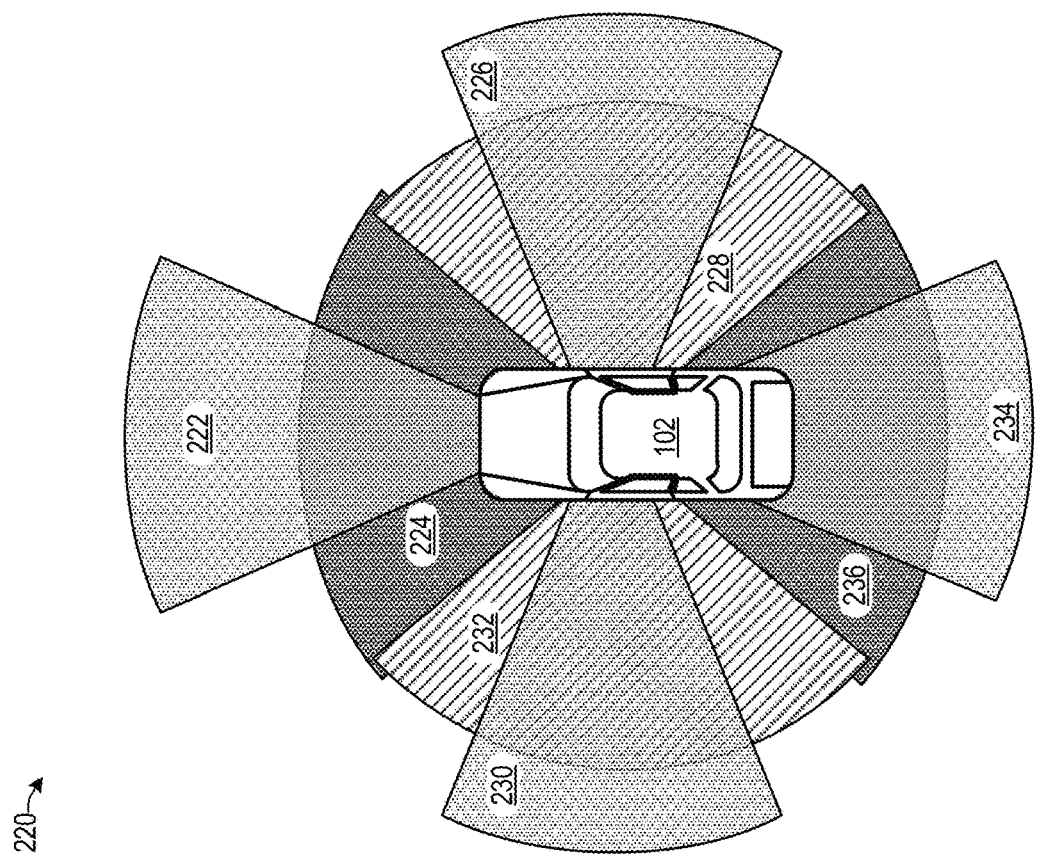
FIG. 2B illustrates an example vehicle camera configuration according to some implementations.
Figure 2A:
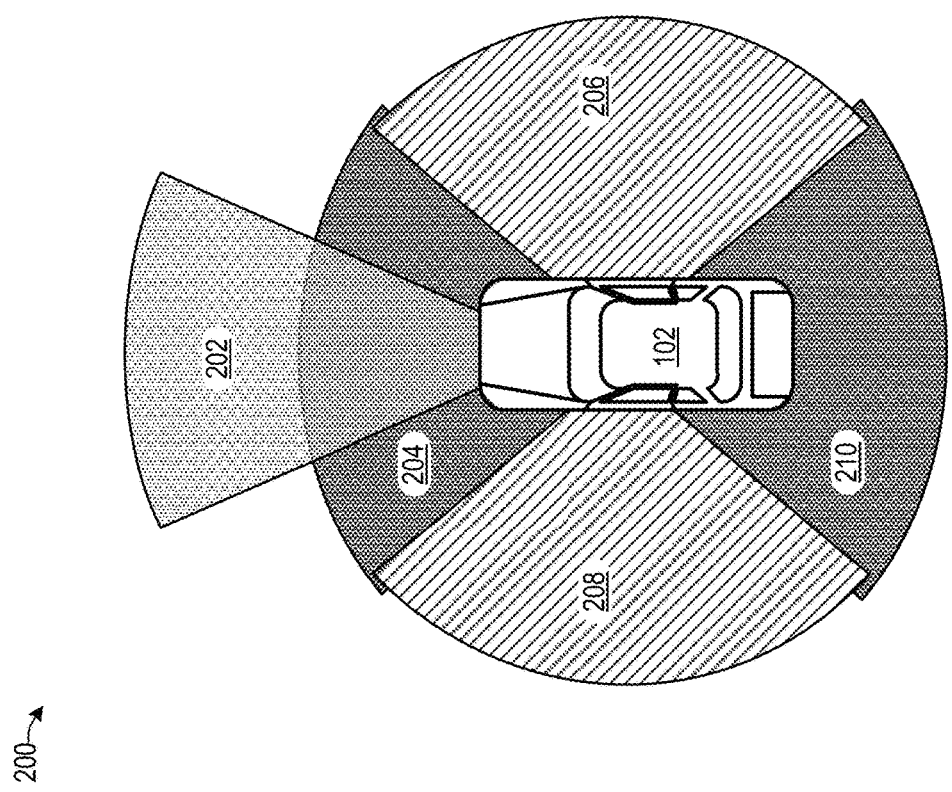
FIG. 2A illustrates an example vehicle camera configuration according to some implementations.

FIG. 2A illustrates an example vehicle camera configuration 200 according to some implementations. For example, there are different kinds of sensing techniques or sensors that may be used for automated driving (AD) and/or ADAS applications. Sensor data may be preprocessed, compressed, filtered, fused, and processed by recognition algorithms to identify the obstacles and road features around the vehicle. The recognition program onboard the vehicle may track the detected obstacles and features, as well as identify their location from the vehicle. Localization may be performed based on input from the map database and sensor input information, such as for determining the vehicle location with respect to the global coordinates, or the like. For each sampling interval, vehicle trajectory and route planning as well as prediction algorithms to predict anomalies or so forth may be determined. Additionally, based on the recognition, localization, and planning outputs, the vehicle control program may determine the acceleration, braking, steering, and other control signals for the vehicle systems.

Although multi-sensor-fusion-based automated driving systems are well adopted, alternative approaches are being investigated as well. For example, while a multi-sensor-fusion-based system is able to provide sufficient information to realize a high level of driving automation, such a system requires high-cost sensors and expensive data processing units for real-time execution. Therefore, some examples herein may employ a multi-camera-based solution focusing on a camera-only or camera-primary based automated driving solution. In the case of a multi-camera-based automated driving system, as illustrated in FIG. 2A, the vehicle 102 may include a long-range forward camera having an FOV 202, a wide range forward camera having an FOV 204, a right side camera having an FOV 206, a left side camera having an FOV 208, and a rear view camera having an FOV 210. In some cases, some or all of these cameras may be mono cameras, and may be provided onboard the vehicle 102 instead of other sensors. In other examples, one or more of the other sensors mentioned above, such as infrared, radar, lidar, ultrasound, etc., may also be included onboard the vehicle.

FIG. 2B illustrates an example vehicle camera configuration 220 according to some implementations. In this example, some or all of the cameras onboard the vehicle 102 may be mono cameras. For example, the vehicle 102 may include a long-range forward camera have an FOV 222, a wide range forward camera having an FOV 224, a long-range right side camera have an FOV 226, a right side camera having a wider FOV 228, a long-range left side camera having an FOV 230, a left side camera having a wider FOV 232, a long-range rear view camera having an FOV 234, and a rear view camera having a wider FOV 236. Additional sensors of other types may or may not be used with this camera arrangement.

Figure 3B:
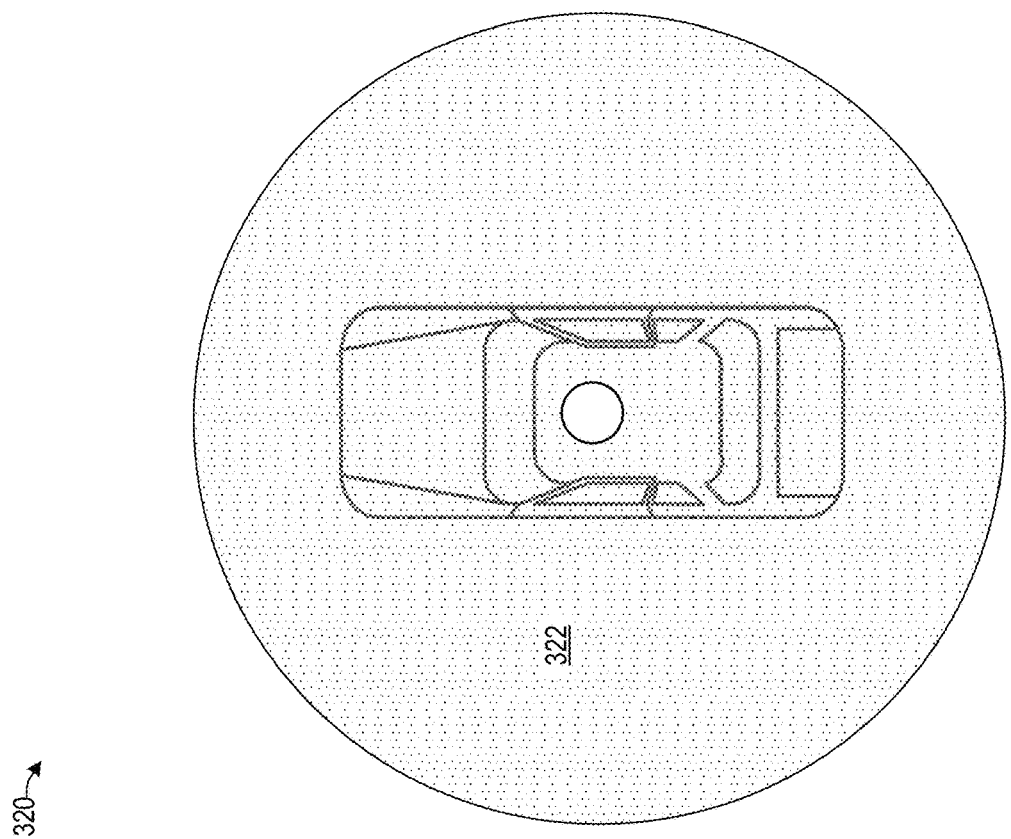
FIG. 3B illustrates an example vehicle camera configuration according to some implementations.
Figure 3A:
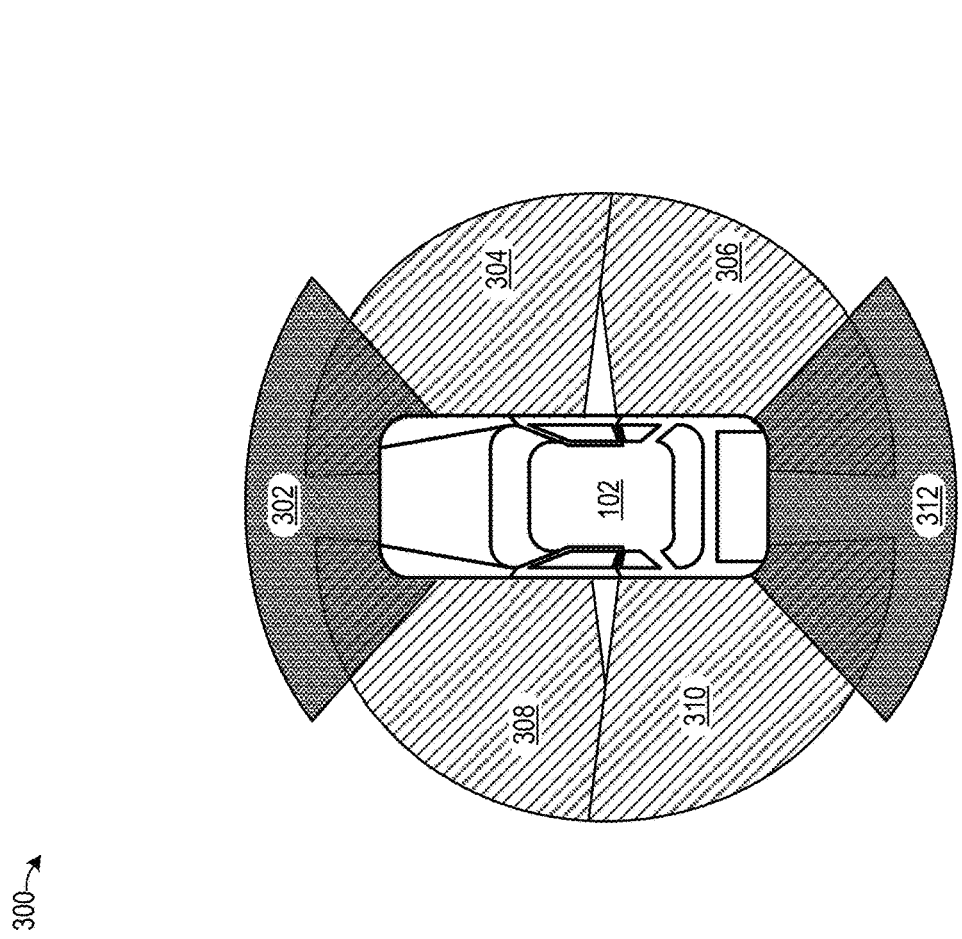
FIG. 3A illustrates an example vehicle camera configuration according to some implementations.

FIG. 3A illustrates an example vehicle camera configuration 300 according to some implementations. In this example, some or all of the cameras may be stereo cameras. The vehicle 102 may include a forward stereo camera have an FOV 302, a right-forward stereo camera having an FOV 304, a right-rear stereo camera having an FOV 306, a left-forward stereo camera having an FOV 308, a left-rear stereo camera having an FOV 310, and a rear view stereo camera having an FOV 312. Additional sensors of other types may or may not be used with this camera arrangement.

FIG. 3B illustrates an example vehicle camera configuration 320 according to some implementations. In this example, a top mounted fisheye camera may have a 360 degree FOV 322 around the vehicle 202. Additional sensors of other types may or may not be used with this camera arrangement. Furthermore, while several example camera arrangements have been described and illustrated, numerous other variations will be apparent to those of skill in the art having the benefit of the disclosure herein.

Figure 4:
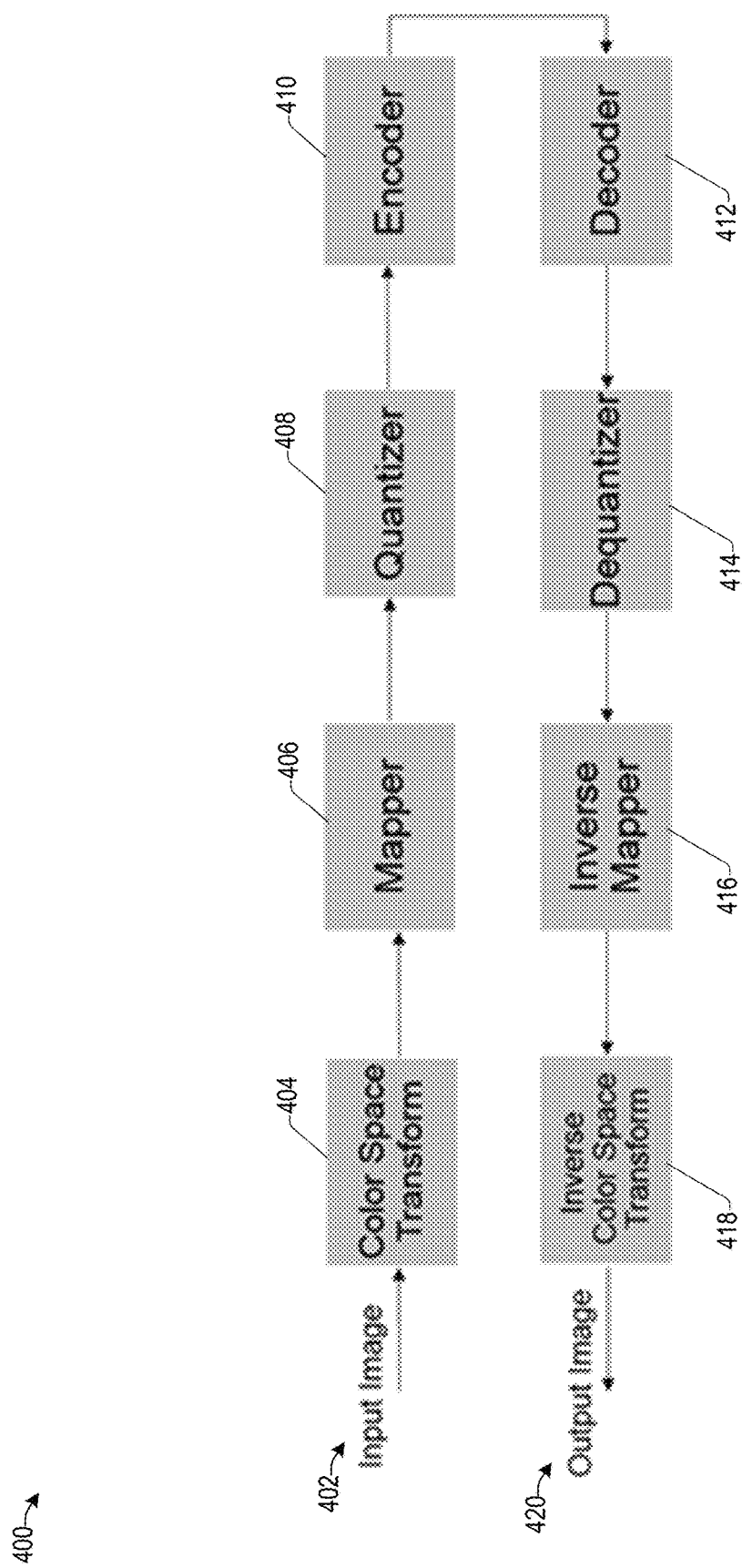
FIG. 4 illustrates an example compression process according to some implementations.

FIG. 4 illustrates an example compression process 400 according to some implementations. For example, a challenge with some autonomous driving systems is handling the very large amounts of image data generated by multiple onboard cameras. As the world moves towards greater vehicle autonomy, the number of cameras employed on board vehicles may continue to increase, and their resolution may also increase, e.g., from 1-megapixel to 8-megapixel, and their frame rates may also increase, e.g., from the 10 to 30 frames per second (FPS) of today to 60 or more FPS. For example, a 2.3-megapixel resolution camera may produce approximately 0.83 Gb of raw image data over 1 second at 30 FPS, while an 8.3-megapixel camera produces 5.98 Gb per second. For an autonomous driving platform, a 10 Gigabit Ethernet cable may not be sufficient to handle image data received from all the cameras onboard a vehicle. On the other hand, autonomous vehicle vision systems also should offer very high levels of reliability and functional safety, real-time execution with low latency, minimal power consumption, the flexibility to work with different camera configurations, and extensive capabilities to implement AI algorithms for the recognition program at the perception layer. Accordingly, implementations herein provide techniques for optimizing the data flow from the cameras to the perception layer.

The image compression techniques herein address the restrictions on data storage and transmission. Image compression can be defined as minimizing the size in bytes of an image file without degrading the quality of the image to an unacceptable level (e.g., a level at which the recognition program is not able to recognize objects of interest). Image compression allows more images to be stored in each amount of memory space and also reduces the time for an image to be sent over a unit time. For example, when ECU processing capability causes a bottleneck, the use of image compression according to the examples herein allows the autonomous driving system to process the data in a more timely manner. The compressed images may also be stored and utilized for training machine learning models, AI, or the like, as well as improving the automated driving vehicle control program.

As is known in the art, there are multiple image compression methods that have been developed to date. The metrics to evaluate these image compression methods may include processing speed, compression ratio, and information loss. As mentioned above, regarding information loss, the image compression methods employed herein may be categorized into two separate types: lossless image compression methods and lossy image compression methods. For lossless image compression methods, the image can be restored (decompressed or otherwise decoded) without losing any information of the original image, which means the decompressed image is identical to the original one after decompression. However, the compression ratio (size of the raw image compared with the compressed image) is usually low for these kinds of techniques, and processing speed may also be slow. On the other hand, lossy image compression methods were developed to achieve a higher compression ratio and faster compression processing time. Lossy image compression methods typically allow restoration of an approximation of the original image data at higher speeds than lossless, and at a higher compression ratio.

In some examples herein, image compression may be conducted by multiple image processing steps, such as illustrated in the example of FIG. 4. In this example, a raw image may be received at 402. At 404, as a first step, the image compression method may perform a color space transformation. For example, RGB color space is the most common way to represent color in a computer system. One-color input may be decomposed into red, green, and blue components and stored separately. However, a drawback of the RGB color space is that the three components have equal weights which are not so suitable for compression. Accordingly the YCbCr color space is an alternative triplet-composed color space that is used in some examples. In the YCbCr color space, Y represents Luminance which indicates the intensity of a picture while CbCr represents chrominance, which describes how colorful a picture is, where Cb gives the blueness, and Cr gives the redness. The purpose of the YCbCr color space in the context of compression is that the chrominance channels usually contain much less information than the luminance channel and are thus better compressible.

At 406, a mapper may transform the pixel values of the input image into interpixel coefficients. Through application of the mapper, there is no loss of information, since the interpixel coefficients can be transformed back to the pixel values. This step may achieve a little compression, but is mainly performed as preparation for the following steps. The reason that spatial data is transformed into the frequency domain is that the human eyes are usually less sensitive to high-frequency components so that this data may be removed to reduce overhead. For example, a frequency transform may extract frequency components that are uniformly distributed in spatial data and may put the same frequency components together. Once the high-frequency components have been put together, it is easy to remove them during quantization.

At 408, a quantizer may rescale the coefficients after the color space transform process is applied. This is the step where actual data may be discarded (lost). The quantization uses the quantized value to divide and round the coefficients. For example, a scalar quantizer reduces a range of values by reducing precision. Since this is a lossy method, a quantizer 408 is not used in lossless compression methods herein.

At 410, an encoder, such as in entropy encoder, may be employed to use a model (e.g., codewords), to find a more efficient way of representing the image. This is the step that converts a matrix representation of the image into a bitstream. The bitstream can then be subsequently decoded to obtain the previous representation without losing information, e.g., the encoder procedure is lossless.

A decoding (decompression) method may be used to restore the compressed image to a viewable image. For example, at 412, a decoder may decode the bitstream, such as to generate a matrix representation of the image. At 414, a dequantizer may calculate additional bits for the image matrix. At 416, an inverse mapper may traverse the image pixel by pixel and samples the correct pixel from the source image to an output image. At 418, the inverse color space transform may perform an inverse of the previously performed color space transform (RGB or YCbCr) to generate the restored output image 420.

As several concrete examples of lossless image compression methods that may be employed in some examples, suppose that a raw image is 100 KB. When a lossless image compression method, such as PNG or TIFF, is applied to this image, the image may be reduced in size but not by a substantially large amount, e.g., by 70-20 percent, depending on the compression level selected and the content of the image. Examples of other lossless image compression methods that may be employed in some examples herein include FLIF, HEIF, JPEG 2000 (lossless), JPEG-LS, LDCT, PCX, QOI, TGA, and so forth. Implementations herein are not limited to any particular lossless image compression methods.

Additionally, as several examples of lossy image compression methods, suppose that the raw image is 100 KB. When a lossy image compression method is applied, such as JPEG level 60, the image may be reduced in size to e.g., 4.2 KB. Additionally, if JPEG level 10 is employed, the image may be compressed in size even more, e.g., to 3.4 KB. However, the restored image for the higher compression levels may have lost so much data of the original image as to be unusable for performing recognition on the image.

While there are many different lossy and lossless image compression methods available, it would be ideal from a simplicity standpoint to use the same image compression method in all instances. However, each image compression method and associated image compression level has its merits and demerits. For example, lossy image compression methods may decrease the object recognition accuracy. However, if a lossless image compression method were to be used for the images captured by all cameras onboard an automated vehicle, the ECU that performs the computation task may likely be overloaded. Consequently, the examples herein adaptively identify the optimal image compression method to apply the images received from each camera for various locations at which the vehicle is located. As mentioned above, in some examples herein the image compression method selected for each camera at each location may be determined at least in part using POZs and information from the automated driving disengagement historical database. Examples of lossy compression methods that may be employed according to some examples herein include JPEG, JPEG 2000 (lossy), WebP, HEIF, BPG, DjVu, ICER, PGF, and so forth. Implementations herein are not limited to any particular lossy compression method.

Figure 5:
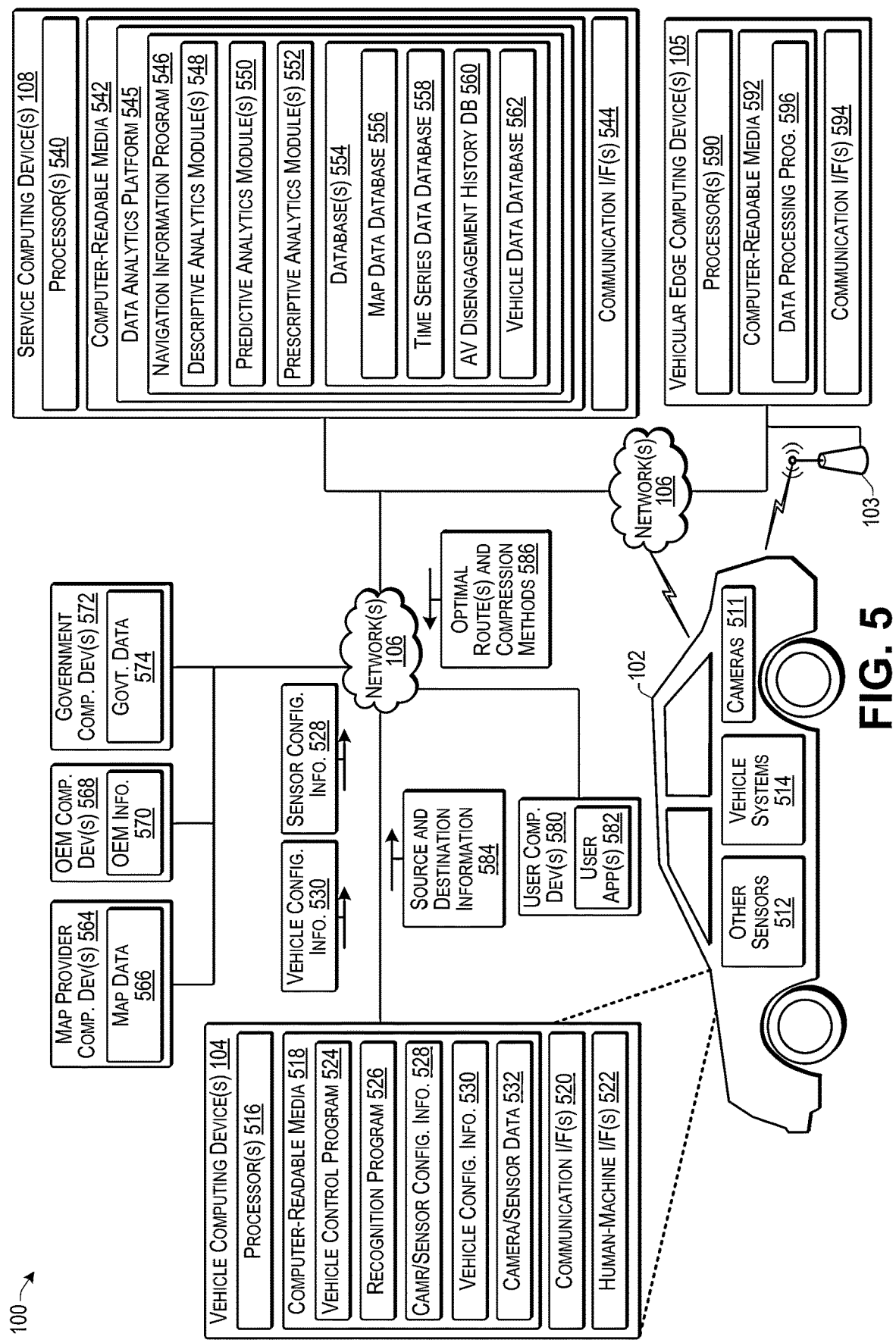
FIG. 5 illustrates an example hardware configuration of the system for allocating resources for a vehicle according to some implementations.

FIG. 5 illustrates an example hardware configuration of the system 100 for allocating resources for a vehicle according to some implementations. As discussed above with respect to FIG. 1, the system 100 includes the vehicle 102 having one or more vehicle computing devices 104 able to communicate wirelessly with the RSUs 103 and VECs 105, and also able to communicate directly over the one or more networks 106. For example, the vehicle computing devices 104 may communicate over the one or more networks 106 with one or more of the service computing devices 108.

The vehicle 102 may further include one or more cameras 511, one or more onboard sensors 512, and one or more vehicle systems 514 that are in communication with the vehicle computing device(s) 104, such as via a CAN bus (controller area network bus) (not shown in FIG. 5) or any other suitable communication link. In some examples, the service computing device(s) 108 may calculate precautionary observation zones (POZs) for candidate routes and may select the optimal route for the vehicle 102. In other examples, the vehicle 102 or the VEC 105 may perform some of the calculation of the POZs such as by using data received from the service computing devices 108. In some cases, selection of the optimal route may include consideration of the compression methods to be used by the vehicle 102 in association with each respective POZ on each candidate route, and further determined in consideration of any automated vehicle disengagement occurrences that may have taken place along the route.

Each vehicle computing device 104 may include one or more processors 516, one or more computer-readable media 518, one or more communication interfaces (I/Fs) 520, and one or more vehicle human-machine interfaces (I/Fs) 522. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 514, such as to perform ADAS and/or AD tasks, such as navigation, braking, steering, acceleration, deceleration, and so forth. The computing device(s) 104 may also include one or more other ECUs, such as for controlling the cameras 511, other systems of the vehicle systems 514, sensors 512, and so forth.

"ECU" is a generic term for any embedded processing system that controls one or more of the systems, subsystems, or components in a vehicle. Software, such as a vehicle control program 524 and a recognition program 526 may be executed by one or more ECUs and may be stored in a portion of the computer-readable media 518 (e.g., program ROM, solid state storage, etc., as discussed below) associated with the respective ECU to enable the ECU to operate as an embedded system. ECUs on a vehicle may typically communicate with each other over a vehicle bus, such as the CAN bus mentioned above, according to a vehicle bus protocol. As an example, the CAN bus protocol is a vehicle bus protocol that allows ECUs and the vehicle systems 514 to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 104 may include one or more processors 516, which may include one or more of central processing units (CPUs), graphics processing units (GPUs), microprocessors, microcomputers, microcontrollers, system-on-chip processors, digital signal processors, state machines, logic circuits, and/or any devices that manipulate signals based on operational instructions. As one example, the processor(s) 516 may include one or more hardware processors and/or logic circuits of any suitable type specifically programmed or configured to execute the algorithms and other processes described herein. The processor(s) 516 may be configured to fetch and execute computer-readable instructions stored in the computer-readable media 518, which may program the processor(s) 516 to perform the functions described herein.

The computer-readable media 518 may include volatile and nonvolatile memory and/or removable and non-removable media implemented in any type of technology for storage of information, such as computer-readable instructions, data structures, programs, program modules, and other code or data. For example, the computer-readable media 518 may include, but is not limited to, RAM, ROM, EEPROM, flash memory or other memory technology, optical storage, solid state storage, magnetic disk, network-attached storage, cloud storage, or any other medium that can be used to store the desired information and that can be accessed by a computing device. Depending on the configuration of the vehicle computing device(s) 104, the computer-readable media 518 may be a tangible non-transitory medium to the extent that, when mentioned, non-transitory computer-readable media exclude media such as energy, carrier signals, electromagnetic waves, and/or signals per se. In some cases, the computer-readable media 518 may be at the same location as the vehicle computing device 104, while in other examples, a portion of the computer-readable media 518 may be remote from the vehicle computing device 104.

The computer-readable media 518 may be used to store any number of functional components that are executable by the processor(s) 516. In many implementations, these functional components comprise instructions or programs that are executable by the processor(s) 516 and that, when executed, specifically program the processor(s) 516 to perform the actions attributed herein to the vehicle computing device 104. Functional components stored in the computer-readable media 518 may include the vehicle control program 524 and the recognition program 526, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 524 and 526 may be part of a single program.

In addition, the computer-readable media 518 may store data, data structures, machine-learning models, and other information used for performing the functions and services described herein. For example, the computer-readable media 518 may store camera and sensor configuration information 528 that includes information about the sensor type, field of view, detection resolution, detection range and other capabilities, current status and operability, and so forth, of the cameras 511 and sensors 512 on board the vehicle 102. Further, the computer-readable media 518 may store vehicle configuration information 530 that includes information about the vehicle 102, such as powertrain configuration information, suspension information, tire information, as well as vehicle brand, model, year, trim level, and the like. Additionally, the computer-readable media 518 may store, at least temporarily, camera and sensor data 532 received from the onboard cameras 511 and sensors 512, and which may also include information about obstacles and landmarks detected during a trip, vehicle location information, and so forth.

Further, while the functional components, data and data structures are illustrated together in this example, during use, some or all of these elements may be stored on or by separate ones of the computing device(s) 104. The computing device(s) 104 may also include or maintain other functional components and data, which may include programs, drivers, etc., and the data used or generated by the other functional components. Further, the computing device(s) 104 may include many other logical, programmatic, and physical components, of which those described above are merely examples that are related to the discussion herein.

The one or more communication interfaces 520 may include one or more software and hardware components for enabling communication with various other devices, such as over the CAN bus, over the one or more network(s) 106, over the air with the RSUs 103, and, in some cases, with other vehicles. For example, the communication interface(s) 520 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, vehicle-to-vehicle, and the like, as additionally enumerated elsewhere herein.

The camera and sensor data 532 may include images data for images received from the cameras 511, and which may be compressed according to the examples herein. In addition, in the case that other sensors 512 are included in the vehicle, the camera and sensor data 532 may include sensor data received from the onboard other sensors 512. For example, the other sensors 512 may include any of a plurality of different types of sensors such as radar, lidar, ultrasound, a global navigation satellite system (GNSS) receiver (referred to hereinafter by the common usage name "GPS", which is also intended to be inclusive of any other satellite navigation system), accelerometers, a compass, and the like. In addition, the camera and sensor data 532 that is used by the vehicle control program 524 may include information received from or associated with various vehicle systems 514, such as (not shown in FIG. 5) from a suspension controller associated with the suspension system, a steering controller associated with the steering system, a vehicle speed controller associated with a braking and acceleration system, and so forth.

For example, the vehicle control program 524 may use rule-based and/or artificial-intelligence-based control algorithms, or any combination thereof, to determine parameters for vehicle control. For instance, the vehicle control program 524 may determine an appropriate action, such as braking, steering, accelerating, or the like, and may send one or more control signals to one or more vehicle systems 514 based on the determined action. For example, the vehicle control program 524 may send control signals to the suspension controller, the steering controller, and/or the vehicle speed controller for controlling or partially controlling the vehicle in some applications.

The human-machine interface(s) 522 may include any suitable type of input/output devices, such as buttons, knobs, joysticks, touchscreens, speakers, microphones, voice recognition and artificial speech technology, in-cabin sensors, such as eye monitoring cameras, vital sign monitors, and so forth. As one example, a vehicle occupant may use a human-machine interface 522 to indicate a destination location, such as via voice command or touchscreen inputs. Implementations herein are not limited to any particular type of human-machine interfaces 522.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing devices 108 as being present in a single location, these components and data may alternatively be distributed across different computing devices and different locations in any desired manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 540, one or more computer-readable media 542, and one or more communication interfaces 544. Each processor 540 may be a single processing unit or a number of processing units, and may include single or multiple computing units or multiple processing cores. The processor(s) 540 can be implemented as one or more microprocessors, microcomputers, microcontrollers, digital signal processors, central processing units, state machines, logic circuitries, and/or any devices that manipulate signals based on operational instructions. For instance, the processor(s) 540 may be one or more hardware processors and/or logic circuits of any suitable type specifically programmed or configured to execute the algorithms and processes described herein. The processor(s) 540 can be configured to fetch and execute computer-readable instructions stored in the computer-readable media 542, which can program the processor(s) 540 to perform the functions described herein.

The computer-readable media 542 may include volatile and nonvolatile memory and/or removable and non-removable media implemented in any type of technology for storage of information, such as computer-readable instructions, data structures, program modules, or other data. Such computer-readable media 542 may include, but is not limited to, RAM, ROM, EEPROM, flash memory or other memory technology, optical storage, solid state storage, magnetic tape, magnetic disk storage, storage arrays, network-attached storage, storage area networks, cloud storage, or any other medium that can be used to store the desired information and that can be accessed by a computing device. Depending on the configuration of the service computing device 108, the computer-readable media 542 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 542 may be used to store any number of functional components that are executable by the processors 540. In many implementations, these functional components comprise instructions or programs that are executable by the processors 540 and that, when executed, specifically configure the one or more processors 540 to perform the actions attributed above to the service computing device 108. For example, the functional components may together provide a data analytics platform 545 that provides the functions attributed to the service computing devices 108. Functional components stored in the computer-readable media 542 may include a navigation information program 546 that may be executed to configure the service computing device 108 to determine and send navigation information, such as routing information and recommended compression methods, to the vehicle computing device 104. For example, the navigation information program 546 may include one or more descriptive analytics modules 548, one or more predictive analytics modules 550, and one or more prescriptive analytics modules 552, which may be executed for determining an optimal route for the vehicle 102, such as based on determining one or more POZs and compression methods for the vehicle 102, as well as for performing other functions.

Examples of descriptive analytics modules 548 may include modules that perform communications, determining vehicle FOV, authentication, data filtering, data fusion, and candidate route prediction and monitoring. Examples of predictive analytics modules 550 may include destination prediction, candidate route prediction and monitoring, determining a precautionary observation zone, speed profile determination, determining VEC locations, and determining compression method for onboard cameras of the vehicles for candidate routes. Examples of prescriptive analytics modules 552 may include modules for routing recommendations and scheduling VEC resources for a vehicle 102.

In addition, the computer-readable media 542 may store or access data used for performing the operations described herein. Further, in some examples, the data may be stored in any suitable type of data structures, such as in one or more databases 554. Examples of databases 554 may include a map data database 556, a time series data database 558, an automated vehicle disengagement history database 560, and a vehicle data database 562. For example, the map data database 556 may include information related to a required FOV for selected road segments, road profiles, high definition maps, and standard maps for various geographic regions. Furthermore, the time series data database 558 may include information such as traffic data, weather data, vehicular communication data, vehicle CAN data, sensor data, and so forth. Additionally, the automated vehicle disengagement history database 560 may maintain information related to disengagement occurrences of automated vehicles such as when an automated vehicle was unable to perform recognition of a target, such as during design, testing, or other operation of the automated vehicle. In addition, the vehicle data database 562 may include information about each vehicle that uses the system 100, which may include vehicle identification information to use for communicating with the vehicle, camera and sensor configuration information 528, vehicle configuration information 530, past destinations of the vehicle or vehicle occupants, information about an owner or other occupant associated with the vehicle, such as an occupant profile including occupant information and preferences, and so forth.

Further, the service computing device 108 may also include or maintain other functional components, data, and databases not specifically shown in FIG. 5, which may include programs, drivers, etc., and the data used or generated by the functional components. Additionally, the service computing device 108 may include many other logical, programmatic, and physical components, of which those described above are merely examples that are related to the discussion herein. Examples of machine-learning models (MLMs) that may be used in some examples of the modules 548, 550 and/or 552 herein, such as for the AI-based algorithms and models, may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, deep-learning neural networks, and so forth.

The communication interface(s) 544 may include one or more interfaces and hardware components for enabling communication with various other devices, such as over the network(s) 106. For example, communication interface(s) 544 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, DSRC, and the like, as additionally enumerated elsewhere herein.

In addition, the service computing device(s) 108, and in some cases, the vehicle computing device(s) 104 may be able to communicate over the one or more networks 106 with one or more information source computing devices, such as web servers, service provider computing devices, public databases, private databases, or the like. Information source computing devices illustrated in this example include one or more map provider computing device(s) 564 that may provide map data 566 to the service computing devices 108 and/or to the vehicle computing devices 104. Additionally, one or more OEM (original equipment manufacturer) computing devices may provide OEM information 570 about vehicles that they manufacture and/or may receive information about their vehicles from the service computing devices 108. Further, one or more government computing devices 572 may provide government data 574, such as road information, state department of motor vehicle information, Department of Transportation information, construction information, and so forth.

The information source computing device(s) 564, 568 and 572 may include hardware and software configurations similar to the service computing devices 108 described above, but with different functional components and data stored thereon or associated therewith. Further, while several types of information source computing devices are described herein, numerous other types of information source computing devices may provide information to the service computing devices 108 and/or the vehicle computing devices 104. For example, the information source computing devices may provide local condition data to the service computing device(s) 108 for indicating the current conditions of specified road segments, such as with respect to weather conditions, traffic, road closures, special events, and so forth.

In addition, a user computing device 580 may execute one or more user applications 582 for providing information and/or instructions to the service computing device 108. For instance, the user computing device may be a mobile device such as a cell phone, smart phone, tablet, wearable device, laptop, or the like that may be used to communicate directly with the service computing device 108 over the one or more networks 106. As one example, the user application 582 may include a browser and the user may use the browser to interact with the service computing device 108 such as for setting preferences, providing information about the vehicle 102, providing information about the user, or the like, via a web application, website, or other suitable user interface.

The VEC(s) 105 may include one or more processors 590, one or more computer readable media 592, and or more communication interfaces 594. The one or more processors 590 may correspond to any of the processors 540 discussed above with respect to the service computing devices 108. The computer readable media 592 may correspond to any of the computer readable media 542 discussed above with respect to the service computing devices 108. The communication interfaces 594 may correspond to any of the communication interfaces 544 discussed above with respect to the service computing devices 108.

The computer readable media 592 of the VEC 105 may include different functional components and data from that included in the service computing devices 108. For instance, in this example, the VEC 105 includes a data processing program 596 that may perform data processing on behalf of vehicle computing devices 104. The data processing program 596 may further manage scheduling of a plurality of vehicles 102 received from the service computing devices 108 for communicating with the respective vehicles 102 when within a threshold radio communication range of the respective VEC 105.

In some examples herein, the vehicle computing device 104 may provide, to the service computing device 108, source and destination information 584 for a trip. For example, the vehicle control program 524 or other suitable program may be executed by the vehicle computing device 104 to send to the service computing device 108 the source location and destination location for desired travel. In addition, the vehicle computing device 104 may provide the camera and sensor configuration information 528 and/or vehicle configuration information 530 to the service computing device 108 if the service computing device 108 does not already possess this information in the vehicle data database 562. Alternatively, in other examples, the vehicle computing device 104 may merely provide source location information to the service computing device 108 and may request a route from the service computing device 108. In response, the service computing device may predict a destination location, such as based on a current time, current location, and an analysis of past trips made by the vehicle 102. As still another example, the service computing device 108 may send a communication to cause the human machine interface 522 to query the vehicle occupant as to a destination location.

As discussed in additional detail below, the service computing device 108 may execute the navigation information program 546 to determine an optimal route for the vehicle 102 from the source location to the destination location. For example, the service computing device may execute the descriptive analytics module(s) 548, the predictive analytics module(s) 550, and the prescriptive analytics module(s) 552 to determine the optimal route based at least in part on determination of one or more POZs for one or more candidate routes and the computational requirements and recommended compression methods associated with each of the determined POZs. The service computing device 108 may further send scheduling requests to the VEC 105 to determine the availability of the computational resources of the respective VEC's 105 along the candidate routes. Upon determining the optimal route(s), the service computing device 108 may send the selected optimal route(s) and compression methods 586 determined, such as based in part on POZ(s) and/or automated vehicle disengagement occurrences that may have occurred in the past with other automated vehicles. The vehicle control program 524 may be executed by the vehicle computing device 104 to navigate the vehicle 102 according to the optimal route(s) and compression methods 586. Details of determining and selecting the optimal route(s) and compression method 586 based in part on POZs and/or automated vehicle disengagement occurrences are discussed additionally below.

To realize the benefits of connected vehicle technologies for partially/fully autonomous vehicles, the connected data analytics platform 545 may receive various different types of the data from different sources such as vehicles 102, infrastructure cameras and other sensors, cellphones, other transportation data services, and so forth, as discussed above. The data analytics platform 545 may process the received data to derive value for end users by using various different modules categorized in analytics layers, such as the descriptive analytics module(s) 548, predictive analytics module(s) 550, and prescriptive analytics module(s) 552. The descriptive analytics modules 548 may include multiple modules used for data processing, authentication, data filtering, data fusing, and so forth. The predictive analytics module(s) 550 may be used to predict different features expected for vehicle control, such as vehicle speed, route, anomaly prediction, and the like, such as by employing AI algorithms, simulation programs, and so forth. The prescriptive analytics modules 552 may include AI modules that provide values to various end users based on their respective requirements for safety, efficiency, comfort, and the like. Accordingly, the data analytics platform 545 may provide values based on user inputs and/or prediction. Furthermore, while three different types of modules are described in the example of FIG. 5, fewer or more types of modules may be employed in other examples of the system herein.

FIGS. 6-10, 13, and 16 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 6:
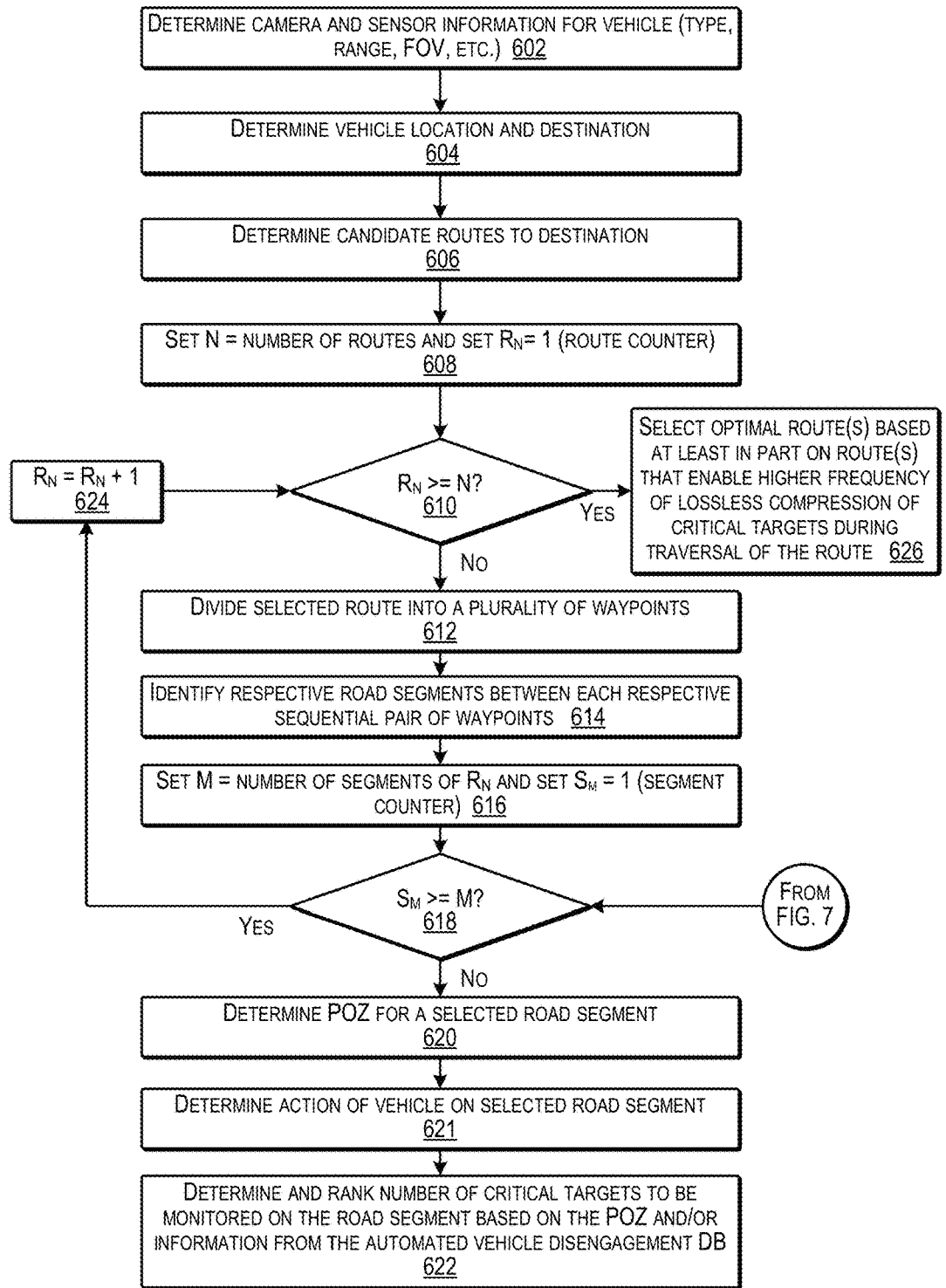
FIG. 6 is a flow diagram illustrating an example process for determining an optimal route and corresponding compression methods to attempt to maximize automated driving over an entire trip according to some implementations.

FIG. 6 is a flow diagram illustrating an example process 600 for determining an optimal route and corresponding compression methods to attempt to maximize automated driving over an entire trip according to some implementations. In some examples, the process 600 may be executed by the system 100 discussed above. For example, the process 600 may be executed by the service computing device 108 executing the navigation information program 546. Alternatively, as mentioned above, in other examples, the process 600 may be executed at least in part by at least one of the VEC 105 or the vehicle computing device 104.

At 602, the service computing device may determine camera and sensor information for the vehicle. For example, the service computing device may receive the camera and sensor information from the vehicle for determining the types of cameras and other sensors, number of cameras and other sensors, ranges, FOVs, resolutions, and so forth.

At 604, the service computing device may determine the vehicle location and destination, such as by receiving one or more communications from the vehicle. For instance, at the beginning of a trip, the vehicle 102 may share its location, destination, sensor information, ECU specifications, etc. with the service computing devices 108.

At 606, the service computing device may determine candidate routes to the destination. For example, a routing and monitoring algorithm may be executed in either the descriptive analytics layer or the predictive analytics layer, as discussed additionally below.

At 608, the service computing device may initialize a first loop by setting a first variable N=number of routes, e.g., representative of the total number candidate routes, and setting a second variable $R_N$=1, e.g., as a counter representative of the candidate route currently selected for processing.

At 610, the service computing device may determine whether the value of $R_N$ is greater than or equal to the value of N. If not, the process goes to block 612 to evaluate a candidate route. If so, all of the candidate routes have been evaluated and the process goes to block 626.

At 612, the service computing device may divide the selected route into a plurality of waypoints. As one example, the waypoints may be defined in advance on a high definition map or a standard map that may be stored in the map data database 556.

At 614, the service computing device may identify respective road segments between each respective sequential pair of waypoints. The length of each road segment between each pair of waypoints may vary from a few centimeters to several hundred meters.

At 616, the service computing device may initialize a nested second loop by setting a third variable M=number of segments of $R_N$, and setting a fourth variable $S_M$=1, e.g., as a counter representative of the segment currently selected for processing.

At 618, the service computing device may determine whether $S_M$ is greater than or equal to M. If not, the process goes to block 620 to evaluate a road segment of the candidate route. If so, all the road segments for the route have been evaluated, and the process goes to block 624 to increment $R_N$ and begin processing the next candidate route, if any.

At 620, the service computing device may determine a POZ for the selected road segment. Examples of how to determine a POZ are discussed below, e.g., with respect to FIGS. 13-15. In some examples, a POZ may include an area of potential obstacle, a sign, or the like, that an automated vehicle should monitor using its onboard sensors for avoiding collision, meeting regulations, and/or ensuring safety. For example, a fully automated vehicle may be expected to monitor the entire POZ of a road segment to enable its fully automated driving functionalities.

At 621, the service computing device may determine an action of the vehicle on the selected road segment. The action of the vehicle may include different driving actions of the vehicle including go straight, make left turn, make right turn, make lane change (left/right), merge, etc. For instance, identifying the action of the vehicle helps to identify and prioritize the number of critical targets (e.g., obstacles, object, road features, etc.) that the vehicle should monitor on that road segment.

At 622, the service computing device may determine and rank (prioritize) the number of critical targets to be monitored on the selected road segment based on the POZ and the information from the automated vehicle disengagement DB. The process then continues at FIG. 7. For instance, the automated vehicle disengagement DB may have been developed using public and private databases. As one example, the California Department of Motor Vehicles (DMV) may share automated vehicle (AV) disengagement records. These AV disengagement records may indicate what kind of issues appeared on certain road segments that required disengagement of automated vehicle functionality. Using such public data, the AV disengagement database 560 may be generated by the system herein. In some cases, the publicly available database may not provide information for all the available roads that may be necessary to cover the entire roads of a country. Consequently, based on the available public and private databases, data extraction and processing may be performed in such a way that the issue that caused the AV disengagement for a particular intersection may be applied to another intersection having a similar road geometry, and for which public database information is not available).

In some cases, the public database may show a specific location having a four way intersection in California at which an incident of AV disengagement took place, and where AV camera sensors could not detect the traffic light correctly. Therefore, recognition of a traffic signal may be given a higher priority at a particular four way intersection that has similar proportions and characteristics, even though an AV disengagement history is not available for the particular four-way intersection. Public records show that there are many different reasons that may result in the disengagement of an AV including failure of a perception algorithm, prediction, control, etc. However, some implementations herein may only take into consideration perception algorithm failures for AV disengagement, and in which it was consecutively decided which road features and/or obstacles should be monitored and correctly recognized to ensure enabling/continuing automated driving on that road segment. For example, when a vehicle is on a road segment where a left turn at the intersection is to be performed, the system may first determine the POZ of the vehicle at that road segment. The POZ at such a location will include regions of interest such as traffic light, pedestrian, incoming vehicle, etc. However, the AV disengagement history database may provide historic data about what were the main reason(s) of AV disengagement for that particular database. Available AV disengagement records may show that the traffic light is smaller than other obstacles, and correct recognition of the traffic light is very critical to avoid such AV disengagement. Therefore, the camera that provides images that are used for traffic light recognition should be designated to use a lossless compression method at the intersection, and the remaining tasks within the POZ be performed using a lossy compression method or a low-level lossless compression method. The selection of image compression method may be performed in such a way that the image compression and utilization of the compressed image may be executed in real-time using available computing resources for that specific location.

In addition, in the case that the available computing resources have sufficient computing power to compress all the images from certain cameras with high lossless compression rate (where critical information of raw image data are all or almost all preserved in the compressed image), the system may decide the compression type of each camera accordingly for navigating the road segment. In some cases, a single camera image may be divided into several areas and a different compression method may be performed on the different areas of the images from the single camera.

At 624, when $S_M$=M, all of the segments in the candidate route have been processed, and the service computing device may increment the variable $R_N$ by a value of one. The process may then return to block 606 to determine whether all candidate routes have been processed, i.e., $R_N$=N.

At 626, when all candidate routes have been processed, the service computing device may select one or more optimal routes based at least in part on Select optimal route(s) based at least in part on route(s) that enable the higher frequency of use of lossless compression of critical targets during traversal of the selected route. Some examples may also consider an amount of autonomous driving available for each respective candidate route. For instance, the optimal route selected may be the route that enables optimal image compression to ensure correct recognition of critical targets, and thereby ensures that fully automated driving is available for maximizing autonomous driving. Further, in some cases, other factors considered may include total driving time to the destination, vehicle occupant comfort, amount of fuel/energy predicted to be consumed by the vehicle when traversing the respective route, or the like.

Figure 7:
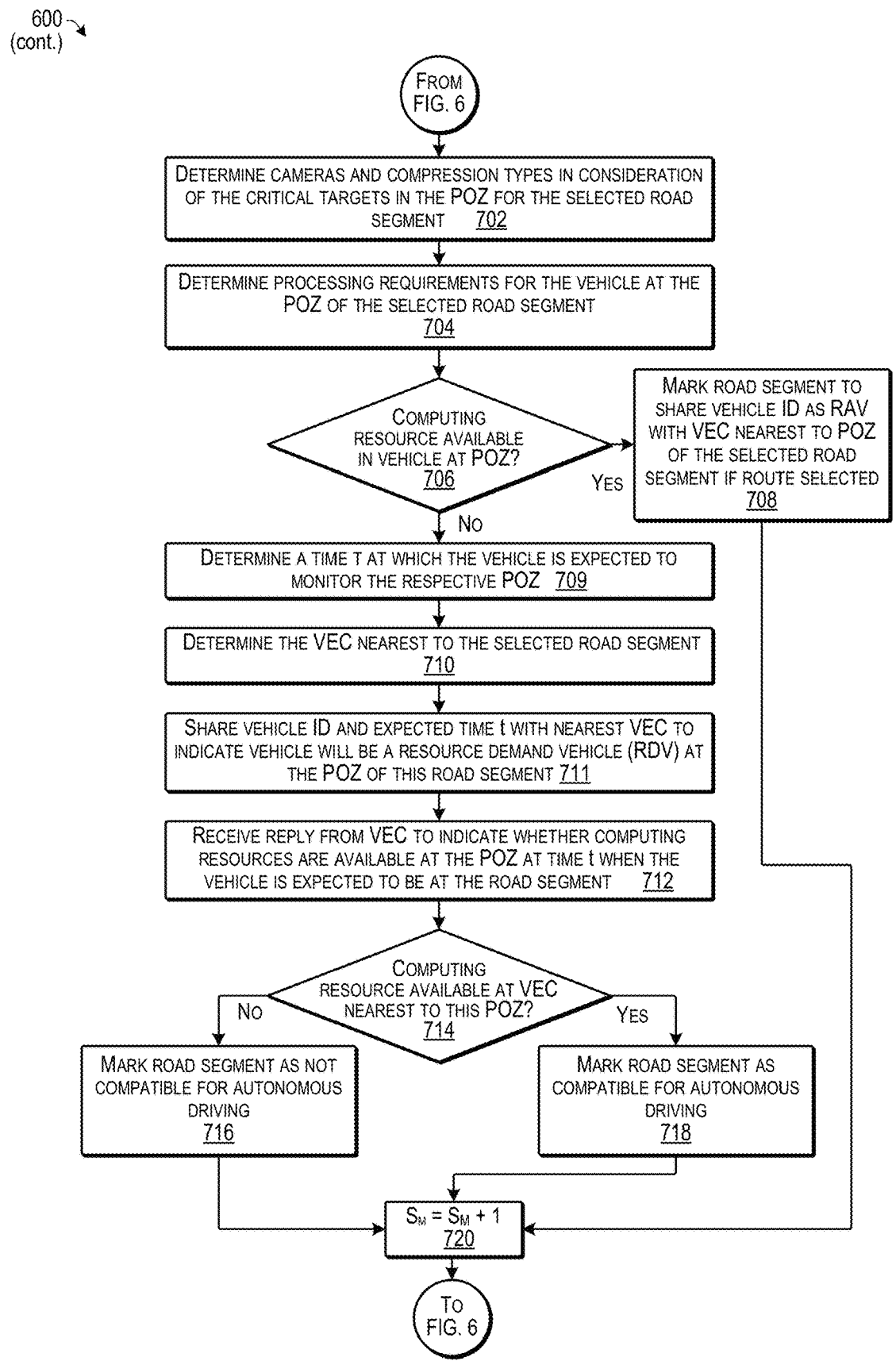
FIG. 7 is a flow diagram that illustrates a continuation of the process of FIG. 6 according to some implementations.

FIG. 7 is a flow diagram that illustrates a continuation of the process 600 of FIG. 6 according to some implementations.

At 702, following block 622, the service computing device may determine cameras and compression types in consideration of the critical targets in the POZ for the selected road segment. For example, the service computing device may determine the POZ and the action of the vehicle for each road segment, and may consecutively decide and prioritize target objects as well as image compression types for cameras whose FOVs will cover the target objects. Once the image compression types for the different cameras are selected (or different areas of an image of different cameras), the service computing device may determine the total processing and computing task of the vehicle for that road segment.

At 704, the service computing device may determine processing requirements for the vehicle at the POZ of the selected road segment. For instance, to operate the vehicle as a fully automated vehicle, the vehicle's cameras and/or other sensors should have the field of view (FOV) to capture the POZ of the corresponding road segment. In the case that the vehicle camera or other sensors cannot cover the POZ for a selected road segment, the service computing device may check for additional data (e.g., data from infrastructure sensors, sensors on other vehicles, or other sensors) that may be obtained and processed by a VEC to provide navigational information (e.g., objects, traffic, signs, signals, road anomalies, or the like) to the vehicle 102.

At 706, the service computing device may determine whether the computing resources in the vehicle will be available for use by the VEC at the POZ of the road segment being processed. If so, the process goes to 708. If not, the process goes to 710.

At 708, the service computing device may mark or otherwise designate the road segment to share the vehicle ID as a resource available vehicle (RAV) with the VEC nearest to the POZ of the selected road segment if the candidate route being evaluated is selected. Thus, at the time t, the vehicle may be one that the VEC may access for performing some computational processing for another vehicle in the vicinity of the POZ.

At 709, when the vehicle is not a RAV, the computing device may determine the time t at which the vehicle is expected to reach the respective POZ.

At 710, the service computing device may determine the VEC that is nearest to the selected road segment.

At 711, the service computing device may share the vehicle ID and expected time t with nearest VEC determined at 711 to indicate that the vehicle will be a resource demand vehicle (RDV) at the POZ of this road segment at the time t, to determine whether the VEC will have computational capacity to provide supporting resources to the vehicle 102.

At 712, the service computing device may receive a reply from the VEC to indicate whether a sufficient computing resource is available at the POZ at time t.

At 714, the service computing device may determine whether the VEC indicated that a computing resource is available at the VEC nearest to the POZ of the road segment currently being evaluated. If so, the process goes to 718. If not, the process goes to 716.

At 716, the service computing device may mark or otherwise indicate that the road segment is not compatible with autonomous driving. For example, if a sufficient amount of computing resources are not available on the vehicle or at the VEC nearest to the POZ of the road segment at the indicated time t, then autonomous operation of the vehicle through the POZ may not be possible and the road segment being analyzed may be indicated to be incompatible with autonomous driving. For instance, the compression of different camera images may be optimized based on the critical targets priority as determined in the previous steps. However, in the case of a road segment in which the vehicle ECU and/or VEC do not have sufficient processing capacity to compress the images at a desired level that is required to ensure best recognition accuracy and execution in real-time, the road segment may be considered as not a suitable segment for fully automated driving.

At 718, the service computing device may mark or otherwise indicate the road segment to be compatible with autonomous driving. For example, if the VEC nearest to the POZ indicates that sufficient computing resources are available at the indicated time t, then the road segment is indicated to be an automated driving road segment.

At 720, the service computing device may increment the variable $S_M$ by a value of one, and may return to block 618 of FIG. 6. For example, the process of blocks 612-622, and 702-720 may be repeated until all road segments in a selected candidate route have been analyzed. When this process is complete, block 618 redirects the process to block 624 to increment the route counter for selecting a next candidate route, if any, for processing. As discussed above with respect to block 626, when all candidate routes have been processed, the service computing device may select one or more optimal routes and corresponding compression methods to send to the vehicle 102, as indicated at 626. Thus, the process may determine the optimal (best) route that enables optimal image compression to ensure correct recognition of critical objects that should be recognized to ensure the fully automated driving capability as well as to ensure safety of the vehicle.

Figure 8:
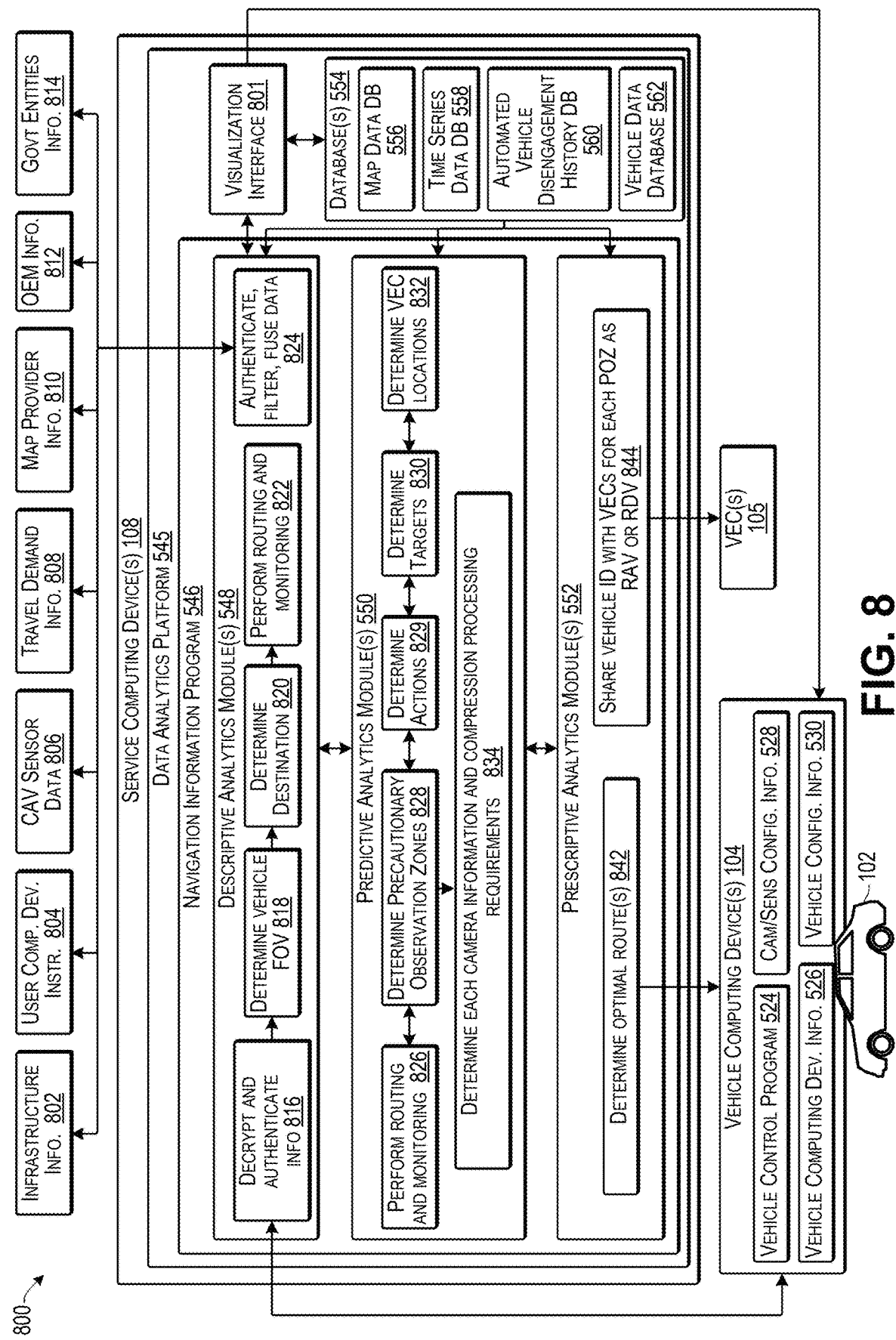
FIG. 8 is a combined flow diagram and block diagram illustrating an example architecture and process for selecting an optimal route for a vehicle according to some implementations.

FIG. 8 is a combined flow diagram and block diagram illustrating an example architecture and process 800 for selecting an optimal route for a vehicle according to some implementations. For instance, the example of FIG. 8 includes a detailed system architecture and data flow that may be used to identify a safe route that maximized automated driving for a connected vehicle by determining POZs along candidate routes and taking into consideration a vehicle's onboard sensor configuration, vehicle powertrain configuration, and other vehicle configuration information. In some cases, the architecture of FIG. 8 may correspond to the system 100 discussed above with respect to FIGS. 1 and 5. The data analytics platform 545 receives the data from different sources such as vehicles, infrastructure sensors, cellphones, web servers of fleet companies, insurance providers, government entities (state DMVs, federal entities, etc.), other transportation data services, and so forth. The data analytics platform 545 may process the received data to derive values for end users by using different artificial intelligence (AI) modules categorized in different analytics layers, including the descriptive analytics modules 548, the predictive analytics modules 550, and prescriptive analytics modules 552, as well as databases 554 and a visualization interface 801. Further, the data analytics platform 545 is able to share vehicle data with other third parties such as OEMs and may ingest data from third parties, such as map providers, into the data analytics platform 545.

In some examples, a portion of the process described may be executed by the vehicle computing device(s) 104, and another portion of the process may be executed by the service computing device(s) 108 or the VECs 105. Furthermore, while in this example, certain functions are being illustrated as being performed by one or the other of the computing devices 104, 105, or 108, respectively, it will be readily apparent to those of skill in the art having the benefit of the disclosure herein that some of the functions may be performed by other ones of the computing devices 104, 105, or 108.

The service computing device(s) 108 hosting the data analytics platform 545 may receive various types of information from various different sources and also may provide data to one or more of the sources. Examples include infrastructure information 802, user computing device instructions 804, CAV sensor data 806, travel demand information 808, map provider information 810, OEM information 812, and government entity information 814. As mentioned above, the infrastructure information 802 may include infrastructure camera images, and other information about infrastructure, road conditions, construction projects, and the like. Furthermore, the user computing device instructions 804 may include user preferences, user information, vehicle information, and the like, received through a user computing device such as through a website or web app interface. Furthermore, the CAV sensor data 806 may include data received directly from vehicle sensors of connected autonomous vehicles, such as connected sensors that automatically transmit data from the vehicle 102 or other vehicles 109 (not shown in FIG. 8) to the service computing device 108.

The travel demand information 808 may provide an indication of possible road crowding based on current and expected demand, which may be based in part on scheduled holidays, air travel and rail travel ticket sales, sporting events and other types of event sales, and so forth. The map provider information 810 may include high definition and low definition maps as well as other information such as traffic data and the like. The OEM information 812 may provide various information about vehicles produced by particular OEMs such as powertrain information, fuel efficiency, and so forth. The government entity information 814 may indicate government provided safety information, traffic sign information, road construction information, road closure information, and so forth. In some examples, one or more data exchange application programing interfaces (APIs) may be employed for exchanging data with the above-discussed entities, such as for receiving data from the above-discussed entities or sending data to the above-discussed entities. Further, the above-discussed entities are only examples of entities with which information may be exchanged, or from which information may be received, and numerous other information entities will be apparent to those of skill in the art having the benefit of the disclosure herein.

As mentioned above with respect to FIG. 5, the databases 554 may include a map data database 556, a time series data database 558, an image data database 560, and a vehicle data database 562. Examples of information that may be maintained in the map data database 556 may include a map of the required FOV for candidate routes, a road profile map or other road profile information, a high definition map of a region in which the vehicle is located, and a standard map of the region in which the vehicle is located. Examples of information that may be included in the time series data database 558 may include information received through the vehicle CAN, vehicle sensor data, traffic data, weather data, and vehicle-to-everything (V2X) data. Examples of information that may be included in the automated vehicle disengagement history database 560 may include information about vehicle disengagement occurrences at various intersections or other road locations. Examples of information that may be maintained in the vehicle data database 562 may include information about individual vehicles such as the vehicle sensor configuration information, vehicle computing device information, vehicle configuration information, vehicle occupant information, history, and preferences, and the like.

Furthermore, at the beginning of a trip, or at any point prior, the vehicle 102 may send, to the service computing device 108, encrypted information about onboard camera and sensor configuration information 528, as well as vehicle configuration information 530, such as ECU information, powertrain and chassis specification, and so forth. In some examples, the vehicle 102 may send this information to the service computing device 108 using a broadcasting protocol such as MQTT, UDP, or the like. Additionally, in some cases, the vehicle 102 may send source location information, such as a current location, and destination location information to the service computing device 108.

At 816, in the data analytics platform 545, the descriptive analytics module(s) 548 may decrypt the received vehicle data such as by using cryptographic hash algorithms such as MD5, SHA-1, SHA256, or any other decryption techniques. Following decryption, the descriptive analytics module(s) 548 may authenticate or otherwise determine the identity of the vehicle and an occupant. For instance, the authentication process may confirm the data has been received from the correct connected vehicle 102 and may validate the integrity of the received data. In addition, the descriptive analytics module(s) 548 may access the vehicle data database 562 to retrieve any information about the vehicle or occupant maintained in the vehicle data database 562. Examples of information that may be retrieved may include the vehicle camera and sensor configuration information 528 and/or vehicle configuration information 530 that may have been previously received for the vehicle 102, as well as user preferences, routing preferences, etc., for an owner of the vehicle or other occupant of the vehicle. Additionally, although not shown in FIG. 8 for clarity of illustration, other processes performed by the data analytics module(s) 548 may include data parsing, data fusion, and the like. For example, a data parsing process may parse an incoming message from the vehicle 102 to a JSON format for further processing, which may include detecting and correcting any corrupt messages sent from the vehicle 102. Further, a data filtering and fusion process may preprocess the data transmitted from the vehicle and update the databases 554 accordingly.

At 818, the descriptive analytics module 548 may determine the vehicle FOV from the vehicle camera and sensor configuration information 528. In some examples, the camera and sensor configuration information 528 may be received from the vehicle 102, while in other examples, the camera and sensor configuration information 528 may be received from the vehicle data database 562. For example, the camera and sensor configuration information 528 may be unlikely to change substantially over time and therefore, having been received previously and stored in the vehicle data database 562, does not need to be transmitted by the vehicle 102 every time a route is to be determined.

At 820, the descriptive analytics module(s) 548 may determine whether a destination location is specified in the received and decrypted vehicle data. If the vehicle destination is available in the decrypted vehicle data, the process goes to 822 to perform routing and monitoring. In some cases, the system may prompt the vehicle occupant for the destination, which may result in the destination being received via voice recognition or other user input. On the other hand, if the vehicle destination is not included in the received information and is not provided by the vehicle occupant, the process may go to 826 to perform the routing and monitoring with prediction of the destination location.

At 822, descriptive analytics module(s) 548 may execute a routing and monitoring algorithm that accepts inputs of vehicle source location, destination location, map, traffic and weather data, and determines candidate routes for the vehicle to reach the destination location. For instance, real-time traffic may be updated using a time loop that executes at a fixed time interval and obtains traffic data from a third party. The traffic data may be ingested in the database and sent to the routing and monitoring algorithm. The routing and monitoring algorithm may be executed by either the descriptive analytics module(s) 548 or the predictive analytics module(s) 550, which may be alternatively invoked based on whether the destination location has been provided or needs to be predicted. If the destination location is not available to the descriptive analytics module(s) 548, the routing and monitoring algorithm may be executed by the predictive analytics module(s) 548 based on use of an AI-based model to predict the destination location, such as by considering the vehicle occupant's history, time of the day, vehicle location, and the like. After the destination location is predicted and, optionally, confirmed by the vehicle occupant, the routing and monitoring algorithm may be executed to generate candidate routes to the destination location as discussed additionally below with respect to 826.

At 824, the descriptive analytics module(s) 548 may further receive the data from the various external sources 802-814, and may perform authentication, filtering, and/or fusing of the received data. For example, the data analytics platform 545 may use data filtering and data fusion to ingest various types of time series and image data obtained from traffic infrastructure, user smartphones, third parties, and so forth. As one example, one or more blockchain networks may be used for exchanging data with at least some of the external sources 802-814. The data may be ingested and stored in the databases 554 or the like. As several non-limiting examples, the data may be managed using a combination of SQL (Structured Query Language) and non-SQL databases for achieving superior real-time performance of the data analytics platform 545.

At 826, in the case that the destination location is not included in the received information received from the vehicle 102, the predictive analytics module(s) 550 may predict the destination location, such as by using a machine learning model, a rule-based model, or the like, and/or based on a vehicle occupant profile, historic trip data, time-of-day, and/or other information stored in the vehicle data database 562. The predicted destination may be sent by the service computing device 108 to a voice assistant or other human-machine interface associated with the vehicle computing device 104. As one example, an interactive voice request may be sent to the vehicle occupant for obtaining confirmation of the predicted destination. The predictive analytics module(s) 550 may receive a confirmation of the predicted destination location or a user input that indicates an alternative destination location. Following determination of the destination location, the predictive analytics module(s) 550 may perform routing and monitoring to determine candidate routes between the source location and the destination location. An example of determining candidate routes is discussed, e.g., with respect to FIG. 11.

At 828, after the candidate routes are determined between the source location and the destination location, the computing device may divide the candidate routes into road segments and may determine a POZ for each segment of each candidate route. For example, after the data analytics platform 545 identifies the destination of a connected vehicle, a POZ determination algorithm may be executed to determine an area of a potential obstacle, a sign, a traffic signal, or the like, for each road segment of each of the candidate routes that a fully or partially automated vehicle (which may include a robot, drone, etc.) may need to monitor using its onboard sensors for avoiding a collision, meeting regulations, and ensuring safety. As mentioned above, each candidate route may be divided into multiple road segments, which are the distance between two consecutive waypoints/nodes. Road waypoints or nodes may be defined based on a high definition map or standard map that may be included in the map data database 556. The route waypoints as well as the road segments may be defined by the routing and monitoring process herein. However, determining these features may also be performed by the precautionary observation zone (POZ) process at 828 of FIG. 8. The main task of the POZ process may be to calculate the required observation zone volume for each road segment that an automated vehicle should monitor when traversing a respective road segment.

At 829, the service computing device may determine actions of the vehicle for each POZ for each road segment. Examples of vehicle actions may include Go Straight, Turn Left, Turn Right, Merge, Lane Change (Right/Left/Multiple), and so forth.

At 830, the service computing device may determine targets based on the actions for each of the POZs and the road segment. As one example, once the action on the road segment is identified, the system may search the automated vehicle (AV) disengagement history DB 560 for the road segment being considered. As mentioned previously, AV disengagement history indicates the causes of the disengagement of AV functions. The AV disengagement history DB may be prepared using data available from public and/or private entities. In the situation that the AV disengagement history is not available in the databases for the specific road segment, the system may search the AV disengagement history for a similar road segment (e.g., sharing similar physical characteristics). Here, the road geometry like number of lanes, lane marking, number of lanes for intersection, presence of traffic signs, etc. are considered for a specific road segment. For example, in case of a road segment that consists of in total 5 lanes (2 upstream lanes and 2 downstream lanes are separated by a buffer lane), the system searches similar road segments in the AV disengagement database using the number of lanes and their lane marking features. A similar strategy may also be applied for intersection road segments. Once the AV disengagement history is determined for the road segment, the number of critical objects that should be recognized accurately is determined. During this step, critical targets are selected which are within the POZ of the road segment. For example, in the case of a road segment in which a vehicle with the action "Go Straight" crosses a 4-way intersection, critical objects are obtained based on the AV disengagement history. Suppose that the AV disengagement history showed that at the intersection, automated driving disengagement happened mostly due to the incorrect recognition of traffic lights, wrong path planning, inaccurate prediction of the surrounding vehicle motion, or the like. In the examples herein, the system may be configured to focus on achievement of higher perception accuracy and thereby focus on the recognition failures of the prior vehicles (e.g., failure to recognize a traffic light). Based on this, the system selects the critical objects accordingly. Thus, if the AV disengagement history shows traffic light recognition failure, the traffic light may be assigned to be the highest priority critical object that is to be recognized with the highest accuracy. Subsequently, other obstacles and road features may be prioritized based on the action, size, importance, and the like. In some cases, where one road segment shows two AV disengagement histories with two different obstacles/objects/road features indicated to be the cause, the selection of the highest priority critical object may be for the object that has smaller physical dimension. For example a traffic light may be assigned a higher priority than another vehicle because the traffic light is physically smaller than the other vehicle.

At 832, the service computing device may further determine whether there are VECs near to the POZs for each road segment, such as for providing additional processing capacity.

At 834, the service computing device may determine each camera information and compression processing requirements. For example, once the critical objects are prioritized and listed for the road segment, the system may determine which cameras need to be used to recognize the critical objects that should be recognized accurately to enable the AV to cross the segment with AD capability. In the case that the vehicle sensors are not sufficient to cover all of the identified critical objects, the system may determine the availability of infrastructure cameras (or another vehicle camera) through one of the VECs if a VEC was identified as being near to the road segment. If the vehicle is equipped with the cameras that are sufficient to cover the critical objects within the POZ of the road segment, and based on the cameras location and FOV with respect to the critical objects, the system determines the appropriate image compression techniques for each camera during traversal of the road segment. For example, based on the vehicle ECU (and/or a nearby VEC), the system may determine the appropriate image compression type for the image(s) of the critical object(s). In case that the vehicle has only one camera that covers all the critical targets within the POZ of the segment, separate image compression may be applied to different areas of an image that covers all the different critical targets.

At 842, the candidate routes and corresponding compression methods for the vehicle cameras for each segment of each candidate route may be received at the prescriptive analytics module(s) 552 which may then determine one or more optimal routes. In some examples, the prescriptive analytics module(s) 552 may determine the required computing resources once the image compression type has been decided. Consecutively, the system may compare the available computing resources in the vehicle ECU. If the vehicle ECU has sufficient computing resources, the image compression methods for the various cameras at the various road segments may be finalized, and the corresponding road segment may be marked or otherwise indicated to be compatible with automated driving. In case the vehicle ECU does not have sufficient computing resources, the system may verify the availability of additional computing resources from the nearby VEC(s). If the VEC that is near to the road segment has sufficient computing resources, the corresponding road segment may be marked as compatible with automated driving. Otherwise, if there is not a VEC nearby, or the nearby VEC does not have available computing resources, the system may optimize the image compression techniques for each camera based on the limited available resources and consecutively mark the road segment as not an automated driving capable road segment. The above mentioned steps may be performed for all the road segments for every candidate route, and the system may determine the best route that has the maximum length of automated driving capability which thereby enables a maximum amount of time of automated driving capability of the vehicle. In some cases, the best route selection may also include other considerations such as time, distance, cost, etc. for selecting the optimal route.

At 844, the computing device may send the vehicle ID and a predicted time t to the VECs for the POZs identified along the selected route, and may indicate whether the vehicle will be a resources available vehicle (RAV) or a resources demand vehicle (RDV) when traversing the respective POZ of the respective VEC. In some examples, a threshold may be applied to these designations to account for possible uncertainties such that a vehicle might be designated as RDV to err on the side of safety. For example, even though the vehicle might be determined to just meet the computational requirements, such as by one or several percentage points, or other suitable threshold, the vehicle might still be designated as RDV to provide a safety buffer. As another example, when designating a vehicle as RAV (resources available), a threshold may be applied to ensure that the overcapacity of resources exceeds a threshold such that when the VEC requests the RAV to perform a task, the task does not overwhelm the capacity of the RAV. Thus, the threshold for overcapacity may ensure that RAV is able to provide the requested computational assistance without affecting the RAV's own navigational safety.

Figure 9:
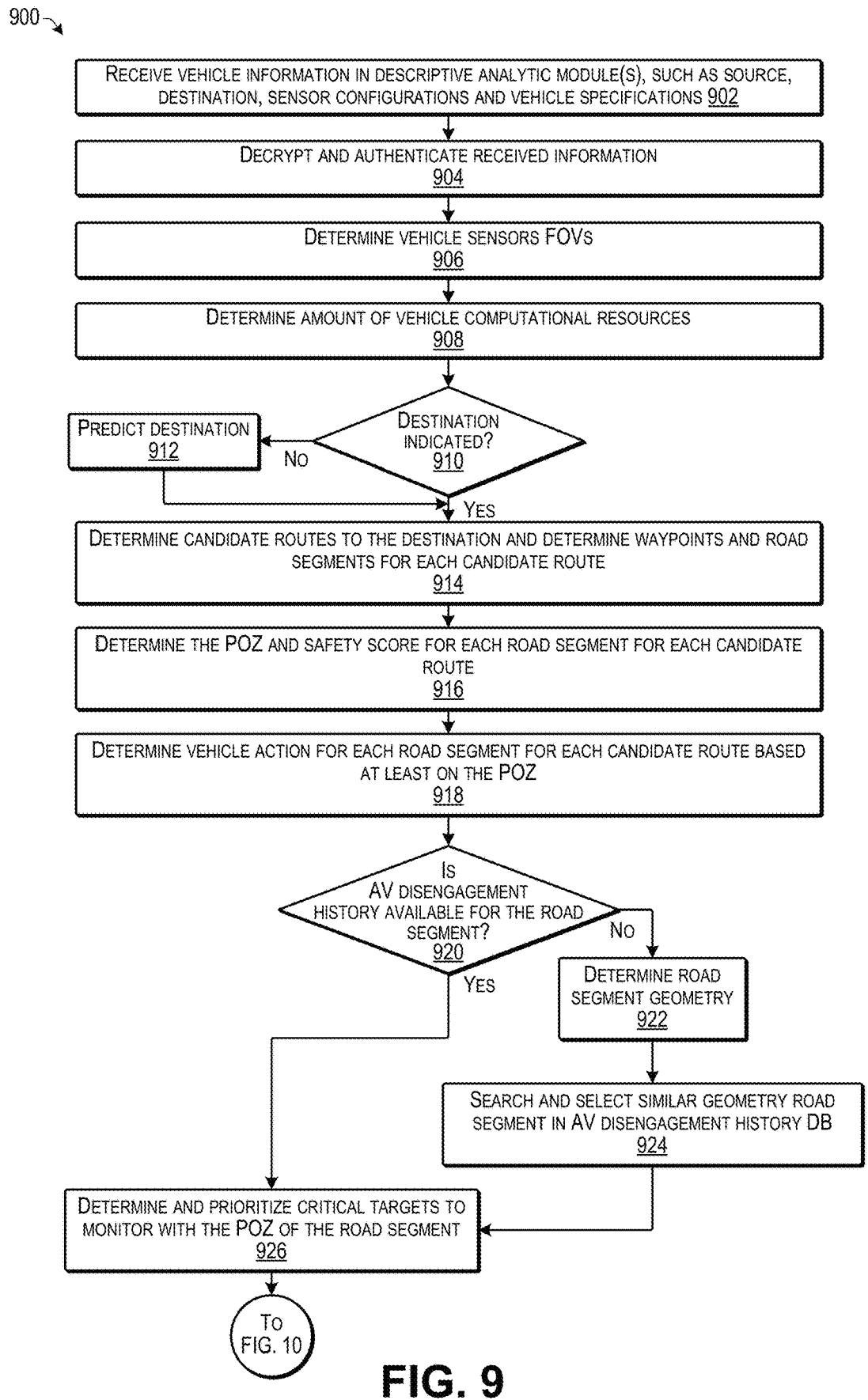
FIG. 9 is a flow diagram illustrating an example process for determining an optimal route from candidate routes according to some implementations.

FIG. 9 is a flow diagram illustrating an example process 900 for determining an optimal route from candidate routes according to some implementations. In some examples, the process 900 may be executed by the system 100 discussed above. For example, the process 900 may be executed by the service computing device 108 executing the navigation information program 546. The process 900 provides additional details to the process 600 discussed above and may be mapped to the data analytics platform 545, such as discussed above with respect to FIGS. 5 and 8.

At 902, the service computing device may receive vehicle information in descriptive analytic module(s), such as source, destination, sensor configurations and vehicle specifications.

At 904, the service computing device may decrypt and authenticate the received information.

At 906, the service computing device may determine vehicle camera and sensor FOVs. For example, the vehicle camera and other sensor specifications are sent to the navigation information program 546 to enable the system to determine the FOVs of the vehicle cameras and other sensors.

At 908, the service computing device may determine the amount of vehicle computational resources, such as based at least on receiving the ECU information for the vehicle.

At 910, the service computing device may determine whether the vehicle destination was indicated in the received information. If so, the process goes to 914. If not, the process goes to 912. If the vehicle destination is available in the decrypted vehicle data, then the routing and monitoring module in the descriptive analytics accepts inputs of vehicle location, destination, map, traffic and weather data and determines potential routes for the vehicle to reach its destination.

At 912, the service computing device may predict the destination based on prior trips, time of day, day of the week, or the like. Alternatively, an inquiry may be sent to the vehicle occupant.

At 914, the service computing device may determine candidate routes to the destination and may determine waypoints and road segments for each candidate route. An example of determining candidate routes is discussed below with respect to FIG. 11. In some cases, the routing and monitoring module may receive inputs of real-time traffic and confirmed destination inputs for route prediction. The real-time traffic is updated using a time loop that executes at fixed time intervals and obtains traffic data from 3rd parties, this traffic data is ingested in the database and sent to the routing and monitoring module. Once the destination has been finalized either by descriptive or predictive routing and monitoring module, candidate routes from start to destination are calculated in the routing and monitoring module using a routing engine. The candidate routes are subsequently sent to the POZ determination function in the predictive layer.

At 916, the service computing device may determine the POZ and a safety score for each road segment for each candidate route. An example is discussed below with respect to FIGS. 12-14. For example, the POZ may be the part of the road segment that the automated vehicle needs to monitor when traversing the road segment. The safety score indicates how much percentage of each POZ can be covered by vehicle camera or other sensor FOV. For automated driving, the vehicle FOV should cover the entire POZ. In case the vehicle FOV cannot cover the POZ for a particular road segment, the computing device may determine the time when the vehicle is expected to traverse the particular road segment and communicates with the VEC to the particular road segment to determine whether the VEC will be able to support the vehicle to realize automated driving for that particular road segment.

At 918, the service computing device may determine a vehicle action for each road segment for each candidate route based at least on the POZ. Examples are discussed above.

At 920, the service computing device may determine whether automated vehicle disengagement history for the road segment is available in the database. If so, the process goes to 926. If not, the process goes to 922.

At 922, the service computing device may determine road segment geometry for the selected road segment.

At 924, the service computing device may search the AV disengagement history database to locate and select a road segment having a geometry similar to the selected road segment.

At 926, the service computing device may determine and prioritize critical targets to monitor within the POZ for the road segment. The process then goes to 1002 of FIG. 10.

Figure 10:
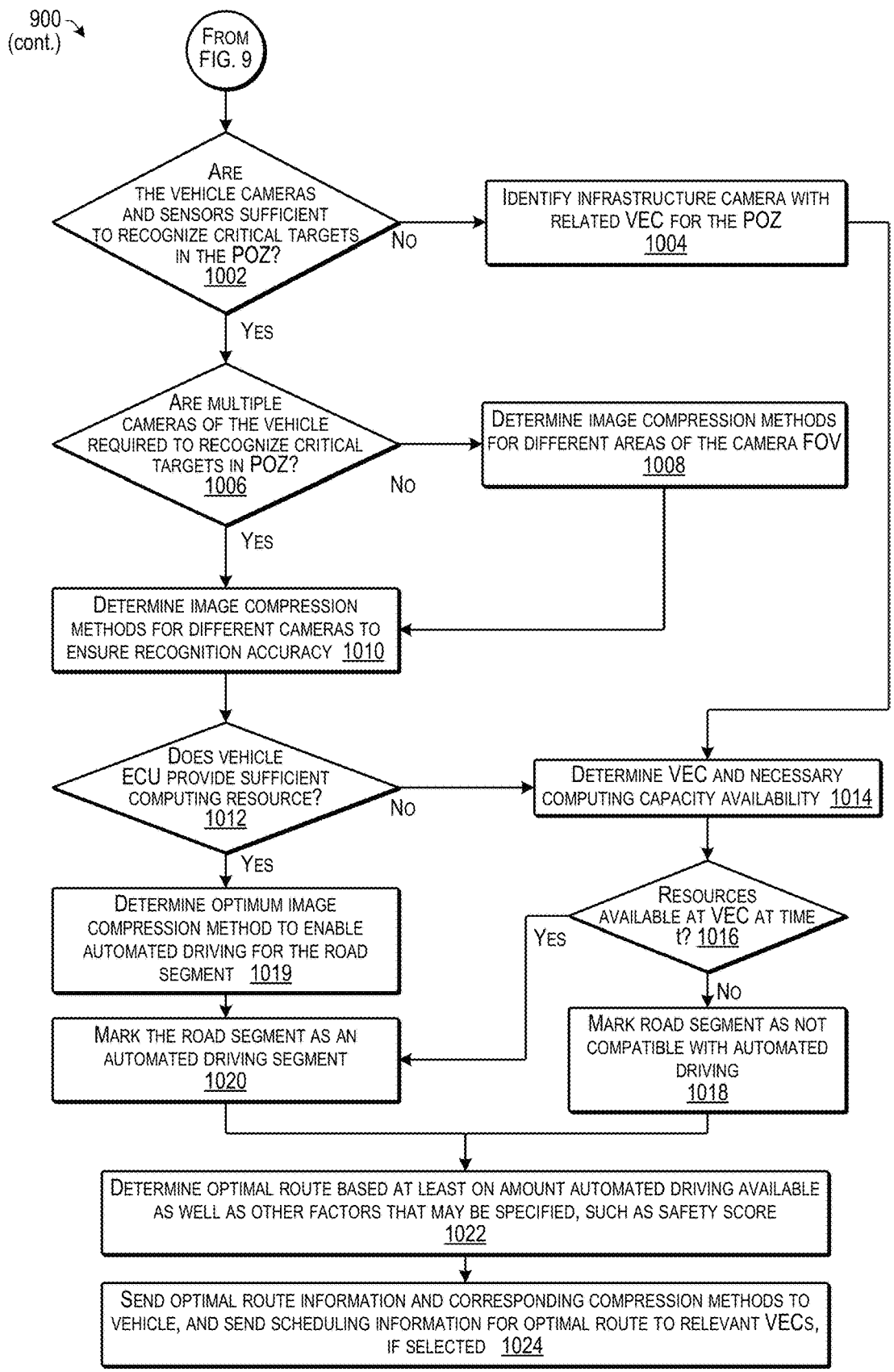
FIG. 10 is a flow diagram that illustrates a continuation of the process of FIG. 9 according to some implementations.

FIG. 10 is a flow diagram that illustrates a continuation of the process 900 of FIG. 9 according to some implementations.

At 1002, the service computing device may determine whether the vehicle cameras and other sensors are sufficient to recognize the critical targets in the POZ of the selected road segment. If so, the process goes to 1006. If not, the process goes to 1004.

At 1004, the service computing device may identify an infrastructure camera with a related VEC for the POZ.

At 1006, the service computing device may determine whether multiple cameras of the vehicle are required to recognize the critical targets in the POZ. If so, the process goes to 1010. If not, the process goes to 1008.

At 1008, since only a single camera will be used to recognize the critical targets, the service computing device may determine two or more different image compression methods for two or more different areas of the camera FOV.

At 1010, when multiple vehicle cameras will be used to recognize the critical targets, the service computing device may determine image compression methods for the images captured by the multiple different cameras based at least in part on the prioritization assigned to the respective critical targets.

At 1012, the service computing device may determine whether the vehicle ECU provides sufficient computing capacity to perform the image compression methods determined at 1010. If so, the process goes to 1019. If not, the process goes to 1014.

At 1014, the service computing device may determine whether a VEC is available for the road segment, and if so, whether the VEC can provide the required computing capacity.

At 1016, the service computing device may determine if a VEC with the computing capacity is available at the time t at which the vehicle is expected to traverse the road segment. If so, the process goes to 1020. If not, the process goes to 1018.

At 1018, when the VEC cannot provide sufficient resources at time t, the service computing device may mark the road segment as not being compatible with automated driving.

At 1019, when the vehicle ECU is determined to be capable of providing sufficient computing capacity, the service computing device may determine optimum image compression methods to enable automated driving for the road segment.

At 1020, the service computing device may mark the road segment as an automated driving segment.

At 1022, the service computing device may determine an optimal route based at least on the amount of automated driving available as well as other factors that may be specified, such as safety score.

At 1024, the service computing device may send the optimal route information corresponding compression methods to the vehicle, and may send scheduling information for the optimal route to relevant VECs, when applicable.

Figure 11:
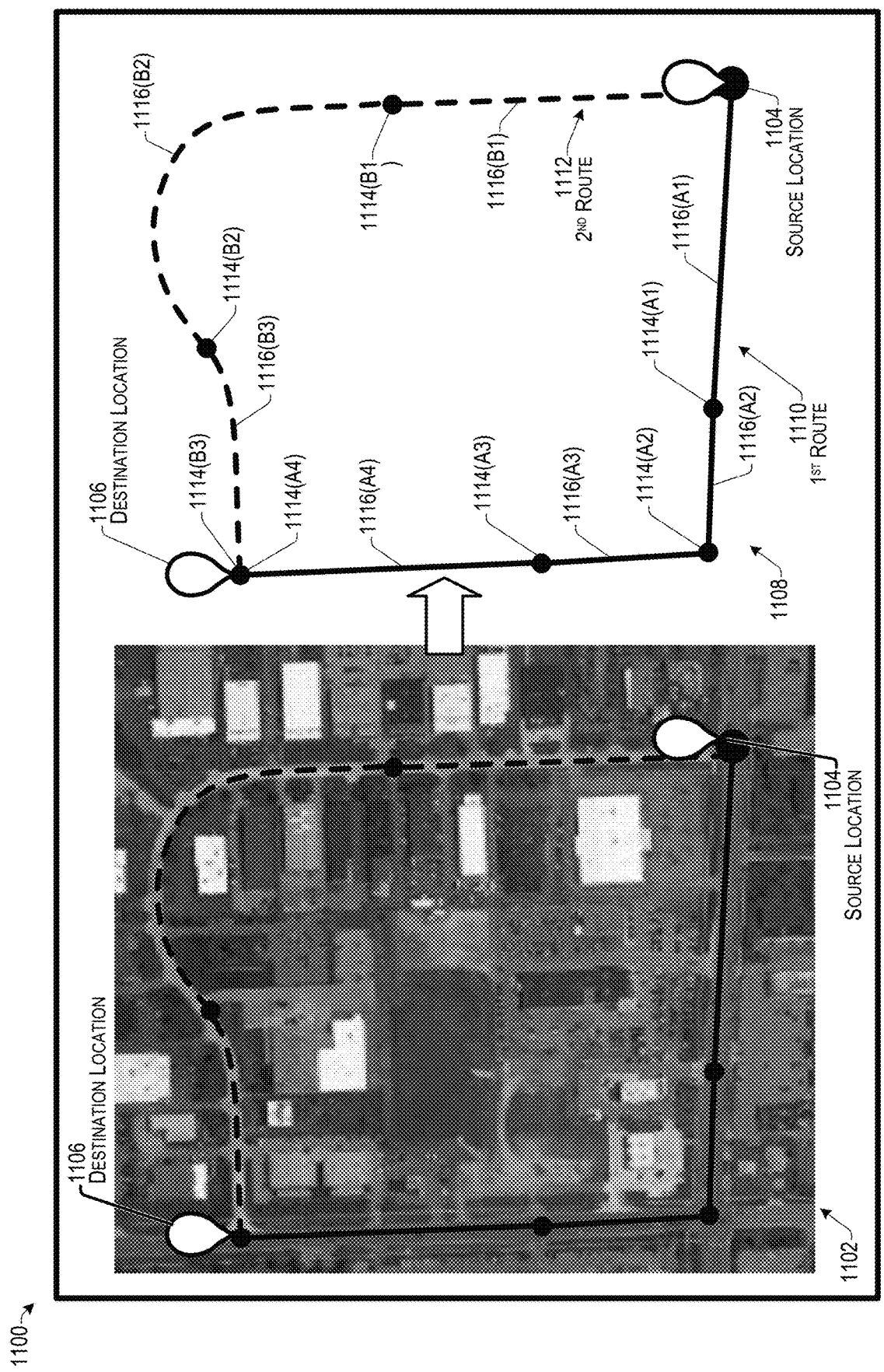
FIG. 11 illustrates an example of determining candidate routes between a source location and a destination location according to some implementations.

FIG. 11 illustrates an example 1100 of determining candidate routes between a source location and a destination location according to some implementations. In this example, as shown on a map 1102, a source location 1104 and a destination location 1106 may be initially determined, e.g., as discussed above. For example, after the source location 1104 and the destination location 1106 have been set, a plurality of feasible candidate routes 1108 may be determined. In this example, two feasible candidate routes 1108 are illustrated, namely a first route 1110 and a second route 1112. In other examples, more or fewer candidate routes may be determined. In addition, in the case that there are a very large number of feasible candidate routes, the number of candidate routes may be narrowed using any of various thresholds such as estimated distance traveled along each route, estimated time of travel for each route, or the like. In some cases, the narrowing criteria may be based at least in part on user preferences.

Each route 1110 and 1112 may be divided into a plurality of segments based on waypoint nodes 1114 and intervening road segments 1116, which are the distance between two waypoints 1114. The locations of the waypoints 1114 and the length of each road segment 1116 may depend in part on the types of roads to be traversed. For instance, road segments 1116 may vary from less than a meter to several hundred meters or more. In some cases waypoints 1114 may correspond to intersections however this is not necessarily always the case, such as in the case of long stretches of road that may be broken into shorter road segments despite not having any intersections.

In the illustrated example, the first route 1110 is divided into four road segments including waypoints 1114(A1), 1114(A2), 1114(A3), and 1114(A4), and road segments 1116(A1), 1116(A2), 1116(A3), and 1116(A4). In addition, the second route 1112 is divided into three road segments including waypoints 1114(B1), 1114(B2), and 1114(B3), and road segments 1116(B1), 1116(B2), and 1116(B3). As mentioned above, in other examples, a different number of waypoints and road segments might be used for each of the routes 1110, 1112. Furthermore, while the map 1102 is illustrated in FIG. 11 for discussion purposes, in operation it may not be necessary for the service computing device 108 to generate a visual map for performing the identification and analysis of the selected routes and road segments.

The data analytics platform 545 may store data in advance for each waypoint 1114 and/or road segment 1116 for all candidate routes or at least the most feasible candidate routes within a geographic region. For example, the data analytics platform 545 may analyze maps of geographic regions in advance for determining routes and possible waypoints and road segments on the roads included in each map. This information may be stored in the map data database 556 discussed above with respect to FIGS. 5 and 8 in advance of receiving a request for route guidance from a vehicle.

Furthermore, for the determined road segments 1116 identified in each map, the data analytics platform 548 may determine in advance and store the POZ for each respective road segment 1116. In this routing example, as discussed additionally below, for the first route 1110 and the second route 1112, the data analytics platform 545 may execute the POZ determination process in the analytics layer to determine the POZs for each segment of each route 1110, 1112. The vehicle sensor FOV may be calculated by the data analytics platform 545 based on the vehicle onboard camera and sensor configuration information 528 received by the data analytics platform 545 for the vehicle 102, such as discussed above with respect to FIG. 8. In addition, once the road segments and POZs for each route have been calculated, the data analytics platform 545 may further determine the compression methods to be used by the vehicle for each of the vehicle cameras at each of the road segments along a respective route, such as based on the AV disengagement history information as discussed above, e.g., with respect to FIGS. 6-10.

Figure 12A:
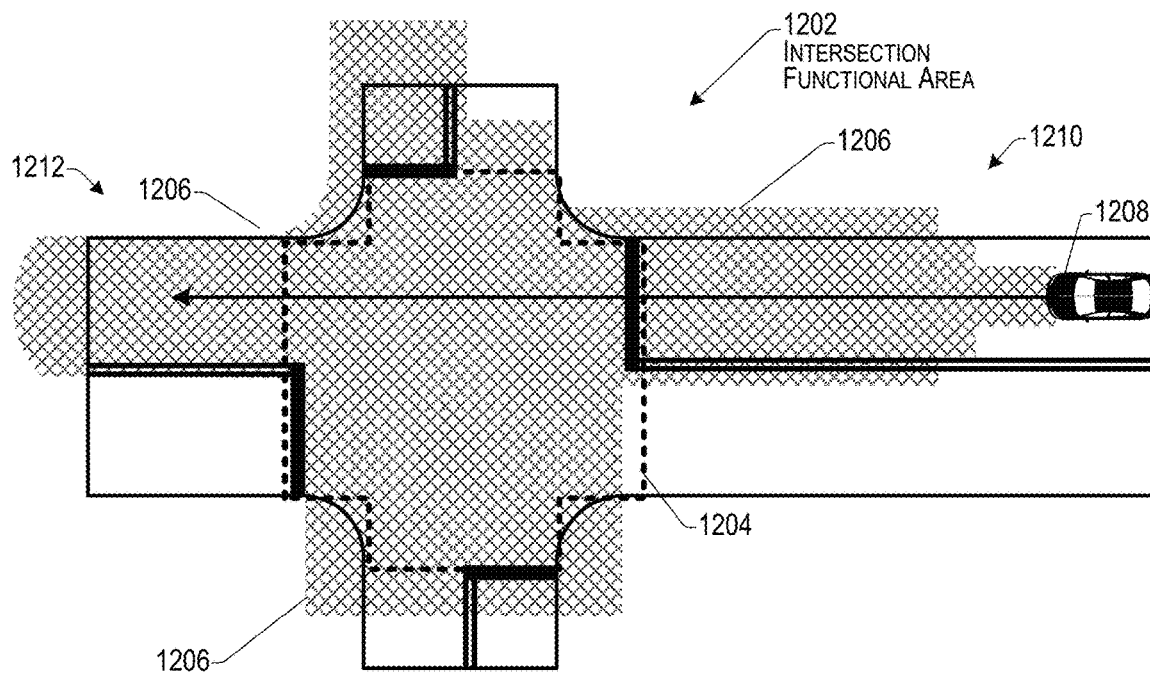
FIGS. 12A and 12B illustrate examples of intersections according to some implementations.
Figure 12B:
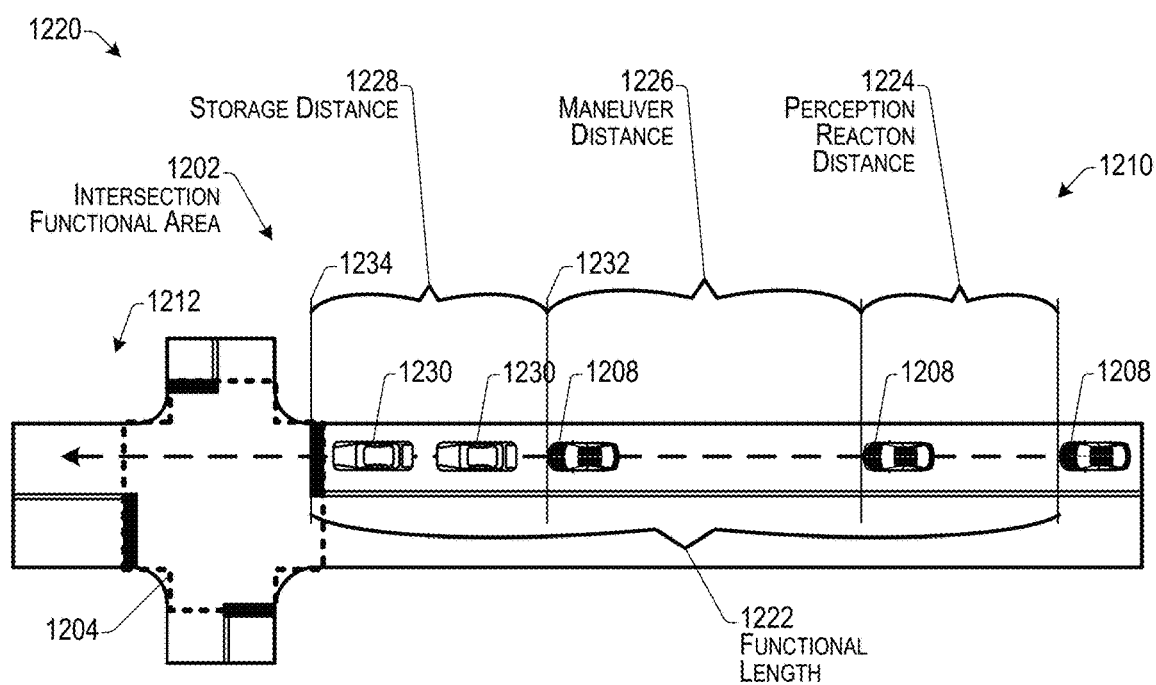

FIGS. 12A and 12B illustrate examples of intersections according to some implementations. FIG. 12A illustrates an example intersection 1200 according to some implementations. The intersection 1200 includes an intersection functional area 1202 indicated by cross hatching. The intersection functional area 1202 may include the crosshatched region that includes both an intersection physical area 1204 of the intersection (indicated by dashed line), and the additional areas 1206 outside of the intersection physical area 1204 in which a vehicle 1208 may maneuver. Thus, the intersection physical area 1204 may correspond to the fixed area within the four corners of the intersection 1200. On the other hand, the overall functional area 1202 may be variable and may include an upstream portion 1210 and a downstream portion 1212 as shown in FIG. 12B.

FIG. 12B illustrates an example intersection 1220 according to some implementations. As mentioned above, contrary to the fixed physical area 1204 of the intersection 1220, the intersection functional area 1202 is variable and includes both upstream portion 1210 and downstream portion 1212 in addition to the physical area 1204. The upstream area 1210 of the intersection functional area 1202 includes a functional length 1222. The functional length 1222 may be divided into several portions, such as when a vehicle 1208 approaches the intersection 1220 and during which the vehicle 1208 decelerates and comes to a complete stop. These portions include a perception reaction distance 1224 and a maneuver distance 1226. In addition, the functional length 1222 may include a storage distance 1228, which may be a portion of the intersection functional area 1202 in which other vehicles 1230 are queued.

Realizing safety at intersections may be accorded a high priority as accidents mostly happen at intersections. At the intersection, a human driver may understand where to make the lane changes, when and how to read the traffic light, location to stop, where to watch before making a turn, when and speed to make the turn, etc. An automated vehicle should have the ability to follow the sequential steps and observe the proper region to make human-like decisions. Thus, an automated vehicle should understand the different regions at intersections, such as those specified by government, local authorities, etc., and perform the same action for each region as a human driver would. The intersection functional area calculation may depend on the road speed limit, location, type of road, etc. which may be defined by designated authorities in each country. In the USA, according to the AASHTO (American Association of State Highway and Transportation Officials) intersection functional length (F) is the sum of stopping sight distance(S) plus the storage length distance (Q) as shown in EQ(1). In case there is no traffic, storage length (Q) becomes zero and intersection functional area becomes the stopping sight distance. The stopping sight distance is the combination of the distances traveled by a vehicle during two phases to stop the vehicle, i.e., a first phase is the perception reaction distance 1224 traveled during perception reaction time and the second phase is the maneuver distance 1226 traveled during a maneuver time:

$$F = S + Q \quad \text{EQ (1)}$$

$$S = (1.47 * V * t) + 1.075 * (V^2/a) \quad \text{EQ (2)}$$

where,
- F=Intersection functional length
- S=Stopping sight distance
- Q=Storage or queue length
- V=Design speed (mph)
- t=Perception reaction time (2.5 Sec)
- a=Deceleration rate (within 11 to 15 ft/sec$^2$, e.g., 11.2 ft/sec$^2$).

The first part of EQ(2) indicates the distance covered during the perception reaction time during which the driver traverses the perception reaction distance 1224, realizes that a decision is needed, and decides what kind of maneuver is appropriate. The perception reaction time may typically be about 2.5 seconds, which includes about 1.5 seconds for perception and about 1.0 seconds for reaction. The second part of EQ(2) indicates the distance traveled by the driver during the maneuver distance 1226 for decelerating the vehicle 1208 and coming to a complete stop, e.g., at 1232 when there are other cars 1230 in the storage distance 1228, or at 1234 when there are no other cars in the storage distance 1228.

Figure 13:
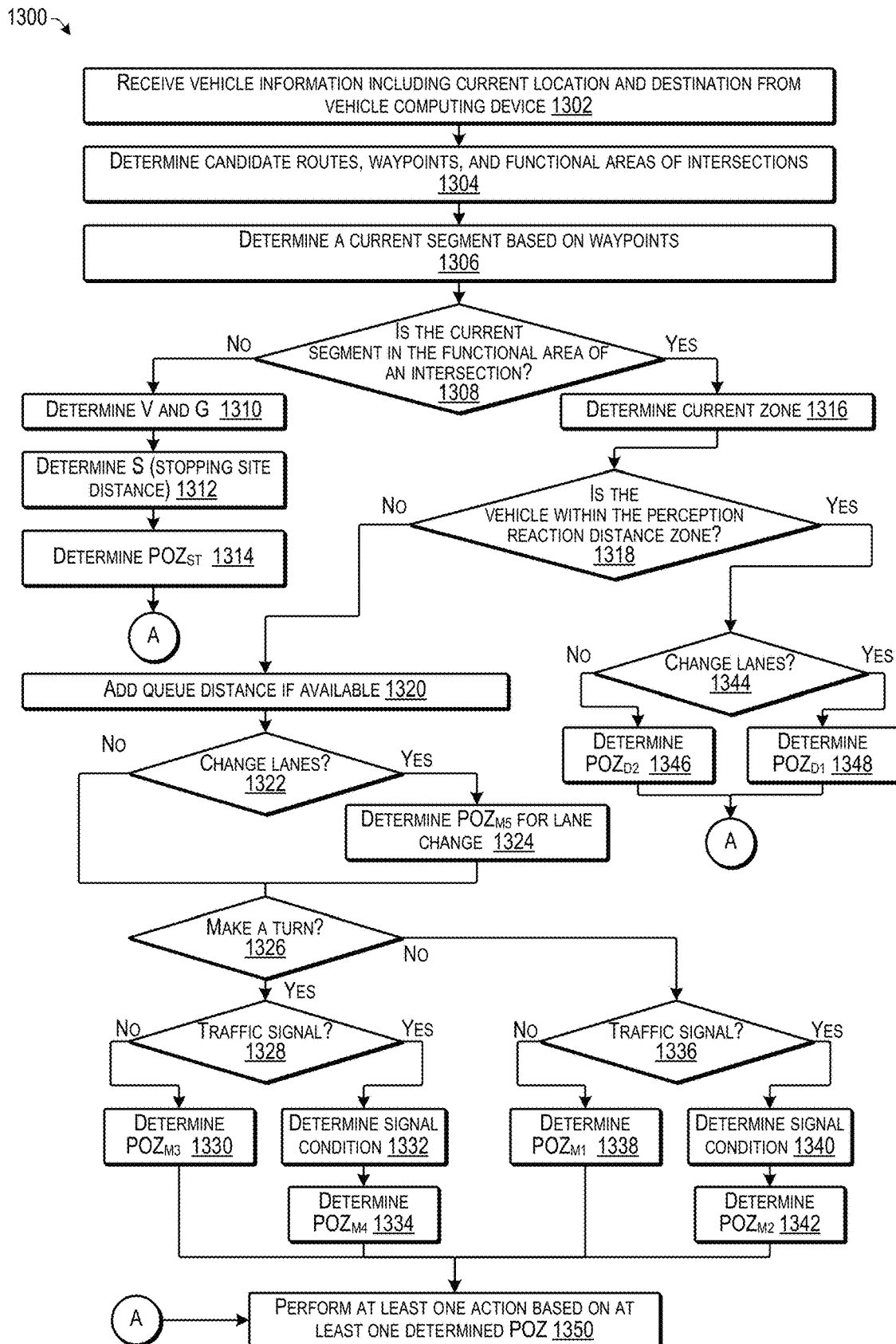
FIG. 13 is a flow diagram illustrating an example process for determining precautionary observation zones (POZs) for various different criteria according to some implementations.

FIG. 13 is a flow diagram illustrating an example process 1300 for determining POZs for various different criteria according to some implementations. In some examples, the process 1300 may be executed by the system 100 discussed above. For example, the process 1300 may be executed by the data analytics platform 545, such as the service computing device(s) 108 executing the navigation information program 546 in some examples. Once a connected vehicle shares its current location and destination, the corresponding road segments may be calculated by the data analytics platform 545 for all the candidate routes to the destination location. The road segments may be divided into two categories: (1) road segments outside of any intersection functional area and (2) road segments inside of an intersection functional area. The POZ determining process 1329 of the predictive data analytics layer may first identify the type of road segments and may then calculate the POZ for that road segment. The system may determine at least one POZ for each road segment of each candidate route.

At 1302, the service computing device 108 may receive vehicle information including current location and destination from the vehicle computing device.

At 1304, the service computing device 108 may determine candidate routes, waypoints, and functional areas of intersections.

At 1306, the service computing device 108 may determine a current segment based on waypoints.

At 1308, the service computing device 108 may determine whether the current segment is in the functional area of the intersection. If so, the process goes to 1316. If not, the process goes to 1310.

At 1310, the service computing device 108 may determine V (design speed) and G (road grade) for the current segment.

At 1312, the service computing device 108 may determine the stopping sight distance S based on the values for V and G determined at 1310 (see EQ(5) below).

At 1314, the service computing device 108 may determine POZ$_{ST}$ for the current segment (e.g., segment is outside intersection functional area).

At 1316, when the current segment is in the functional area of an intersection the service computing device 108 may determine a current zone of the functional area, e.g., the perception reaction distance zone, the maneuver distance zone, or the storage distance zone.

At 1318, the service computing device 108 may determine whether the vehicle is within the perception reaction distance zone. If so, the process goes to 1344. If not, the process goes to 1320.

At 1320, when the vehicle is within the functional area of the intersection but not within the perception reaction distance zone, the service computing device 108 may add the storage queue distance if available.

At 1322, the service computing device 108 may determine whether the vehicle should change lanes, such as based on the intended destination. If so, the process goes to 1324. If not, the process goes to 1326.

At 1324, if the vehicle should change lanes, the service computing device 108 may determine POZ$_{M5}$ for the lane change (e.g., lane change inside functional area of intersection).

At 1326, the service computing device 108 may determine whether the vehicle should make a turn. If so, the process goes to 1328. If not, the process goes to 1336.

At 1328, if the vehicle will be making a turn at the intersection, the service computing device 108 may determine whether there is a traffic signal. If so, the process goes to 1332. If not, the process goes to 1330.

At 1330, when there is not a traffic signal, the service computing device 108 may determine POZ$_{M3}$ for the intersection (e.g., turn at intersection with no traffic signal).

At 1332, when there is a traffic signal, the service computing device 108 may determine the condition of the traffic signal.

At 1334, based on the determined condition of the traffic signal, the service computing device 108 may determine POZ$_{M4}$ for the intersection (e.g., turn at intersection with traffic signal).

At 1336, if the vehicle will not be making a turn at the intersection, the service computing device 108 may determine whether there is a traffic signal. If so, the process goes to 1340. If not, the process goes to 1338.

At 1338, when there is not a traffic signal, the service computing device 108 may determine POZ$_{M1}$ for the intersection (e.g., no turn at intersection with no traffic signal).

At 1340, when there is a traffic signal, the service computing device 108 may determine the condition of the traffic signal.

At 1342, based on the determined condition of the traffic signal, the service computing device 108 may determine POZ$_{M2}$ for the intersection (e.g., no turn at intersection with traffic signal).

At 1344, when the vehicle is within the perception reaction distance zone, the service computing device 108 may determine whether the vehicle should change lanes. If so, the process goes to 1348. If not, the process goes to 1346.

At 1346, when the vehicle was not going to change lanes, the service computing device 108 may determine POZ$_{D2}$ for the current lane (e.g., no lane change).

At 1348, when the vehicle is going to change lanes, the service computing device 108 may determine POZ$_{D1}$ for the new lane (e.g., change lanes).

At 1350, following determination of the POZ at one of 1330, 1334, 1338, 1342, 1346, or 1348, the service computing device 108 may perform at least one action based on at least the POZ, such as sending at least one signal, determining a POZ for a next segment of the candidate route, or the like.

Further, while examples of determining POZs have been provided herein, additional examples are provided in U.S. patent application Ser. No. 17/476,529, filed on Sep. 16, 2021, and which is incorporated by reference herein.

Figure 14:
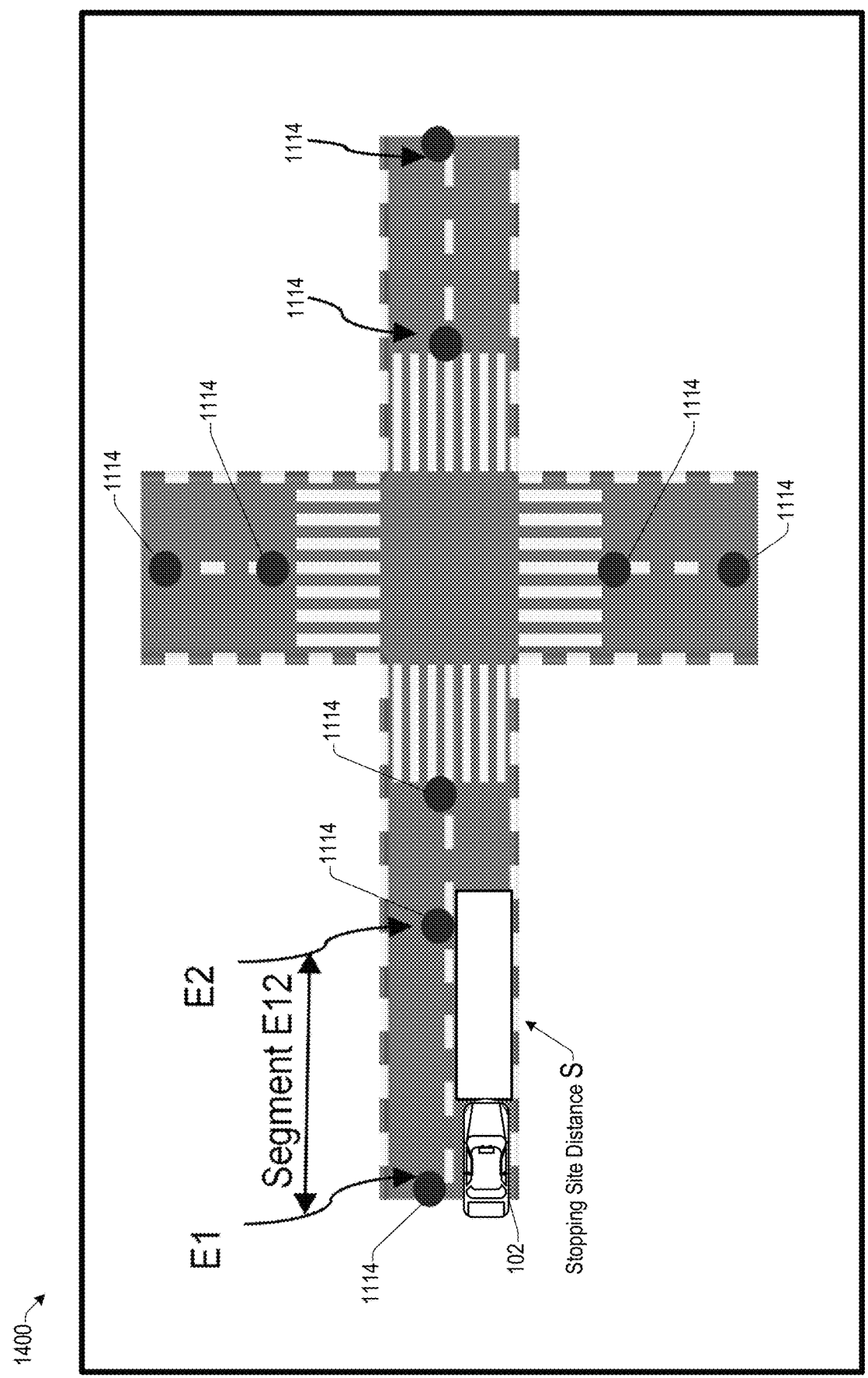
FIG. 14 illustrates an example of determining a POZ in which a current road segment falls outside of an intersection functional area according to some implementations.

FIG. 14 illustrates an example 1400 of determining a POZ in which a current road segment falls outside of an intersection functional area according to some implementations. In this example, the vehicle 102 is located between a first waypoint 1114 designated as E1 and a second waypoint 1114 designated as E2. A plurality of other waypoints 1114 are also illustrated in this example. Accordingly a road segment between the waypoints E1 and E2 may be designated as segment E12 in this example. Further, suppose that the road segment E12 is located outside the intersection functional area discussed above with respect to FIGS. 12A and 12B. When a road segment is located outside of an intersection functional area, stopping sight distance S for that road segment may be calculated as shown in EQ(3):

$$S = (1.47 * V * t) + 1.075 * (V^2/a) \qquad \text{EQ (3)}$$

where,
S=Stopping sight distance
V=Road design speed (mph)
t=Perception reaction time
a=Deceleration rate In addition, EQ(3) can be rewritten as shown in EQ(4) based on the typical values of t=2.5 sec and a=11.2 ft/sec$^2$:

$$S = 3.675 * V + 0.096 * V^2 \qquad \text{EQ (4)}$$

Additionally, in the situation that the road is on a grade G, the stopping sight distance S can take the grade into consideration and may be calculated as shown in EQ(5):

$$S = 3.675 * V + V^2/[30((a/32.2) \pm G/100)] \qquad \text{EQ (5)}$$

In some cases, the road design speed V and road grade G can be either stored in the data analytics platform 545 database(s) 554 for all routes or can be collected in real-time through third party services. Once the stopping sight distance S is calculated, the three-dimensional (3D) region of POZ$_{ST}$ for the road segment outside the intersection functional area may be calculated as shown in FIG. 15 below, such as based on a lane width of 12 feet and a height of 3.5 ft.

Figure 15:
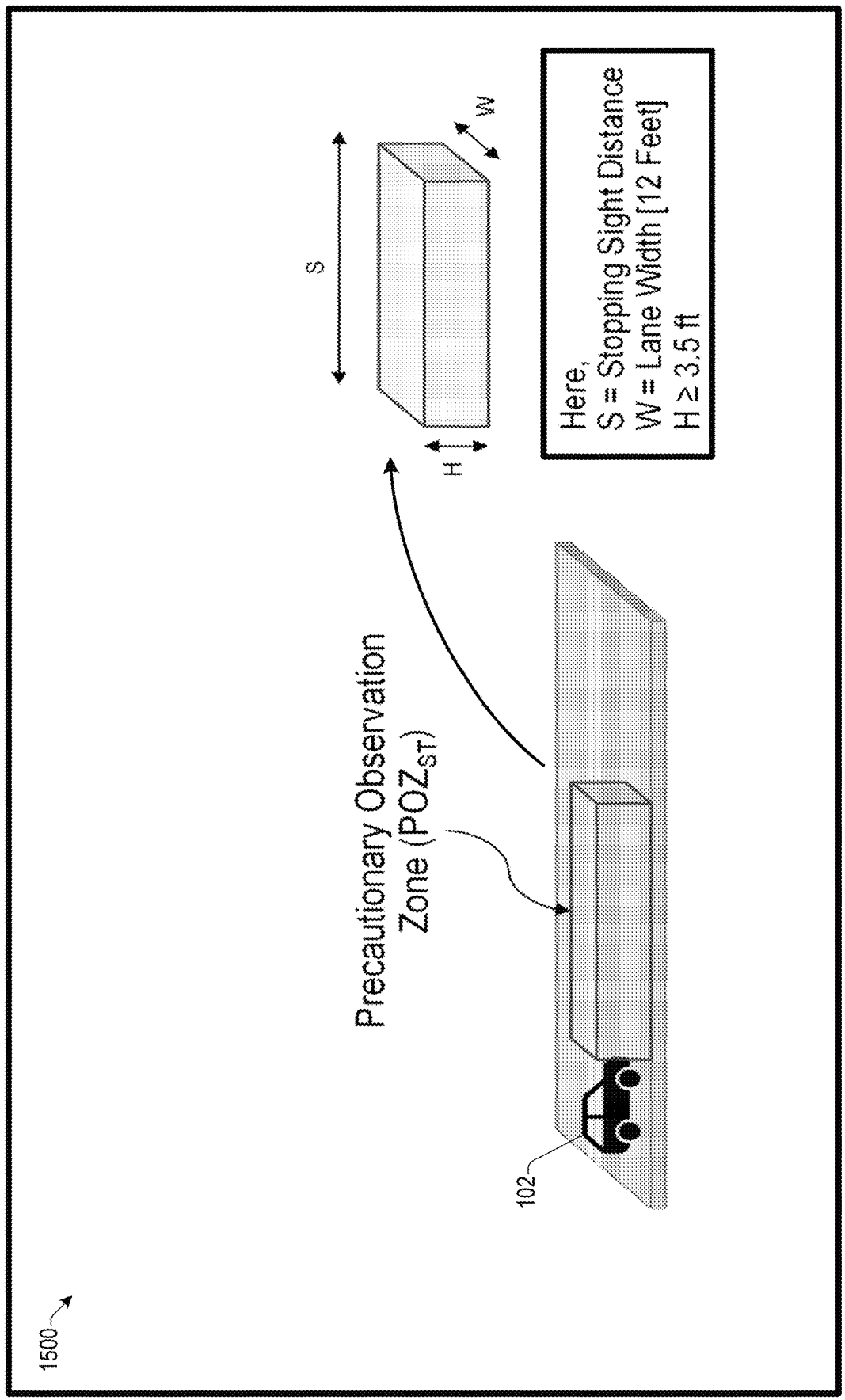
FIG. 15 illustrates an example of determining a POZ according to some implementations.

FIG. 15 illustrates an example 1500 of determining a POZ according to some implementations. In this example, for road segments outside of intersection functional areas, the POZ is designated as POZ$_{ST}$, and may be determined as a volume in 3D space having a length corresponding to the stopping site distance S determined above with respect to FIG. 14; a width W corresponding to the width of the travel lane in which the vehicle 102 is traveling (or will travel), which in this example is a default value of 12 feet; and a height H, which in this example is a default height greater than or equal to 3.5 feet. In some examples, the height H may vary based on any of various factors, such as height of the vehicle, height of expected obstacles, signs, or signals, and so forth.

If a road segment falls inside of an intersection functional area, the next step is to identify its location based on the decision distance zone or ahead of the decision distance zone (maneuver and storage zone). In case the road segment is within the decision distance zone of the intersection functional area, the system may identify whether the vehicle needs to make a lane change or not based on the next segments of destination routes. Three-dimensional POZ$_{D1}$ and POZ$_{D2}$ for the current segment may be calculated considering 12 ft width of lane and 3.5 ft height of driver eye distance from road.

In case the current segment is ahead of the decision distance zone, it is considered to be in the maneuver distance zone. Note that, based on the road type, location and/or traffic, etc. storage length or queue length might be added in some intersections. The storage length of any intersection can be calculated based on the traffic history data. Additionally, storage length can be predicted for any time on the day based on the infrastructure sensor or camera data. Thus, once the current segment is within the intersection functional area but not within the decision distance zone, the queue length may be added if available. Consequently, the POZ may be calculated considering necessity of (further) lane change, making a turn or not, traffic signal intersection or sign-based intersection, etc. As explained above, e.g., with respect to FIG. 8, the POZ may be calculated in the predictive analytics layer for all road segments of all candidate routes. The POZ calculation can be done either in sequential or parallel computing modes. The POZs for the road segments may be stored in the map data database for future use. In this case, the POZ of any road segment immediately available in the map data database, and the system utilizes the stored POZs. The POZs determined for the respective road segments may be used to calculate the safety score for each road segment. To calculate the safety score, the 3D POZs of the road segments for every candidate route may be compared with vehicle sensor FOV. For each road segment, the percentage of 3D POZ covered (overlapped) by the vehicle sensor FOV is calculated. An average safety score percentage may be calculated for each candidate route by averaging the calculated percentage of overlap of the FOV for POZs of all road segments for that candidate route. This average percentage indicates the safety score of the entire route.

Figure 16:
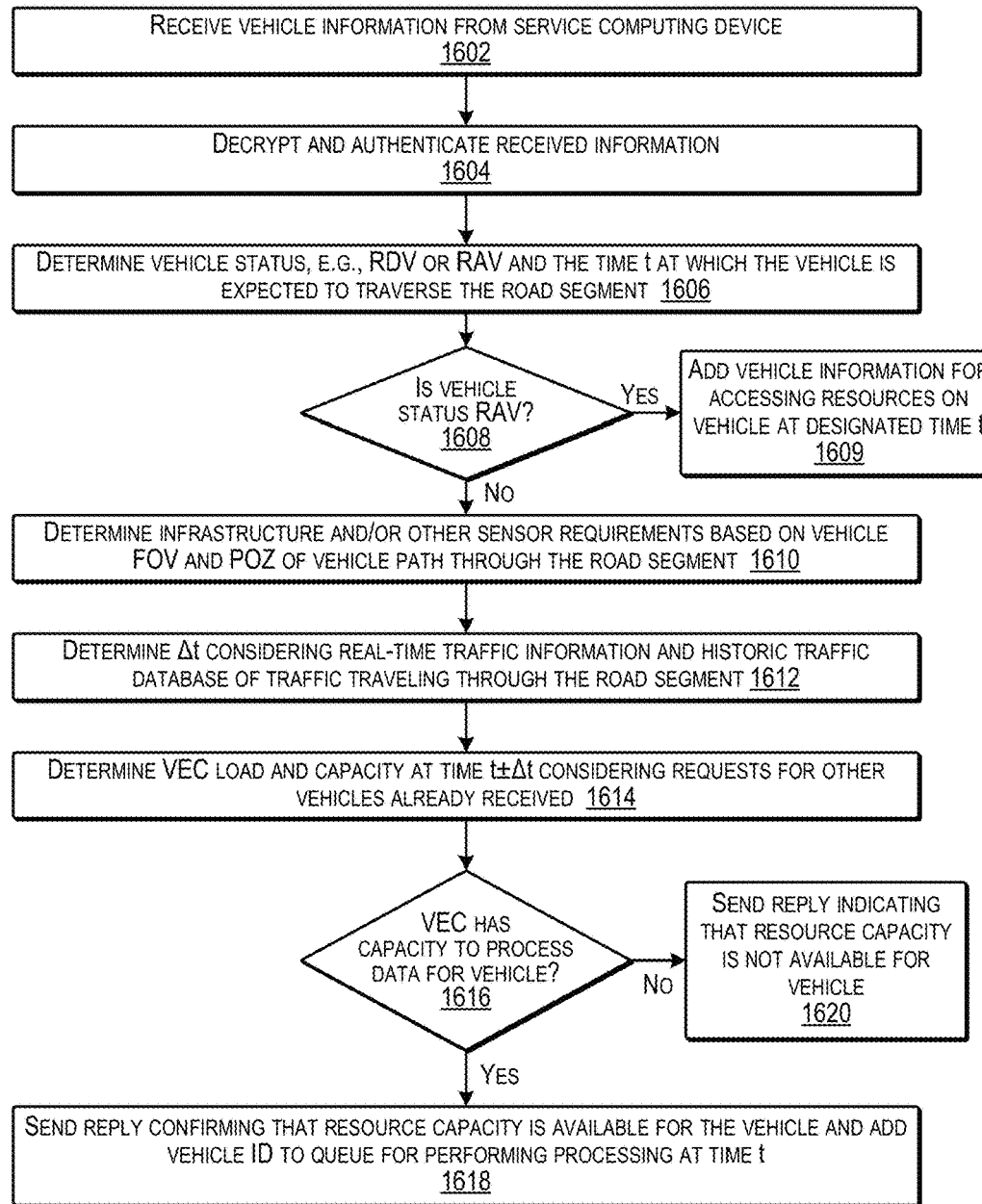
FIG. 16 is a flow diagram illustrating an example process for determining whether a vehicular edge controller (VEC) is able to provide resources to a vehicle according to some implementations.

FIG. 16 is a flow diagram illustrating an example process 1600 for determining whether a VEC is able to provide resources to a vehicle according to some implementations. In some examples, the process 1600 may be executed by the VECs 105 discussed above. For example, the process 1600 may be executed by the VEC 105 executing the data processing program 596.

At 1602, the VEC may receive vehicle information from the service computing device for a vehicle that may traverse a road segment near the VEC.

At 1604, the VEC may decrypt and authenticate the received information about the vehicle.

At 1606, the VEC may determine the vehicle status, e.g., RDV or RAV and the time t at which the vehicle is expected to traverse the road segment and POZ to which the VEC is nearest. If a vehicle is neither RDV or RAV (e.g., RMV in some examples), then the VEC may ignore the vehicle, if notified of the vehicle, or may not even be notified of the vehicle.

At 1608, the VEC may determine whether the vehicle status is RAV (resource available vehicle). If so, the process goes to 1609. If not, the process goes to 1610.

At 1609, when the vehicle status is RAV, the VEC may add the vehicle information to a queue for accessing resources on the vehicle at the designated time t. For example, the VEC may try to expand its computing resources in some examples by utilizing nearby RAV vehicles for their available computing resources.

At 1610, the VEC may determine infrastructure and/or other sensor requirements based on the vehicle FOV, the POZ, and the vehicle path on the road segment corresponding to the POZ for which the vehicle requires assistance. For example, the VEC may list the vehicle ID as a potential candidate requiring support with computational resources for realizing automated driving on the road segment at time t. Once the VEC list the vehicle ID as a potential candidate to support at time t, the VEC identifies the region of interest (the uncovered region) where the vehicle needs extra sensor data (e.g., from infrastructure sensors, from sensors of other vehicles, or the like) to identify obstacles and road features to realize autonomous driving along the road segment. Note that the region of interest can be determined by comparing the FOV of the vehicle's onboard sensors with the POZ of the road segment. The VEC identifies necessary sensor data availability using infrastructure of other nearby vehicle data. The VEC may also perform identification of obstacles and road features for the calculated region of interest (the uncovered region) and may send the calculated perception result, as well as path planning information, to the vehicle. Alternatively, as another example, the VEC may send the raw sensor data from the infrastructure or other vehicles for the region of interest to the vehicle for processing onboard the vehicle if the vehicle has sufficient computing resources available on board the vehicle.

At 1612, the VEC may determine a $\Delta t$ considering real-time traffic information and historic traffic database of traffic traveling along the road segment. For example, the travel time of the connected vehicle from its current location to the VEC's nearest road segments might vary due to several uncertainties, such as traffic, weather, time of the day, etc. The VEC may determine an updated travel time for the vehicle to the VEC's nearest road segment(s) from the vehicle's current location considering data in the traffic history database, real-time traffic information, weather, etc.

At 1614, the VEC may determine the VEC load and computational capacity at time $t \pm \Delta t$ while also taking into consideration requests for providing services to other vehicles already received. For example, the VEC may calculate the overall computing requirement for the road segments (one VEC can be used to support a plurality of nearest road segments). Further, the VEC may connect with a number of connected vehicle data management platforms operated by different organizations and/or service providers. Thus, the VEC determines its total computing load considering requests from multiple sources and based on the available resources at time t.

At 1616, the VEC may determine whether the VEC has the computational capacity to process data for the vehicle at the time t. If so, the process goes to 1618. If not, the process goes to 1620.

At 1618, the VEC may send a reply confirming that resource capacity is available for the vehicle and may add the vehicle ID to a queue for performing processing at the time t. For example, if the VEC has available computing resources to support the overall computing requirement for a RDV at time t, the VEC may confirm with the data management platform at the service computing devices 108 that the VEC will support the vehicle during traversal of the road segment(s).

At 1620, the VEC may send a reply indicating that resource capacity is not available for the vehicle. For example, if sufficient resources are not available, the VEC will decline the request to support the RDV for the corresponding road segment(s). Based on the feedback from the VEC for the vehicle, the service computing device 108 may update the route of the vehicle to indicate that the road segment is not an autonomous driving segment. The process of updating the route will continue until the vehicle arrives at its destination.

Figure 17:
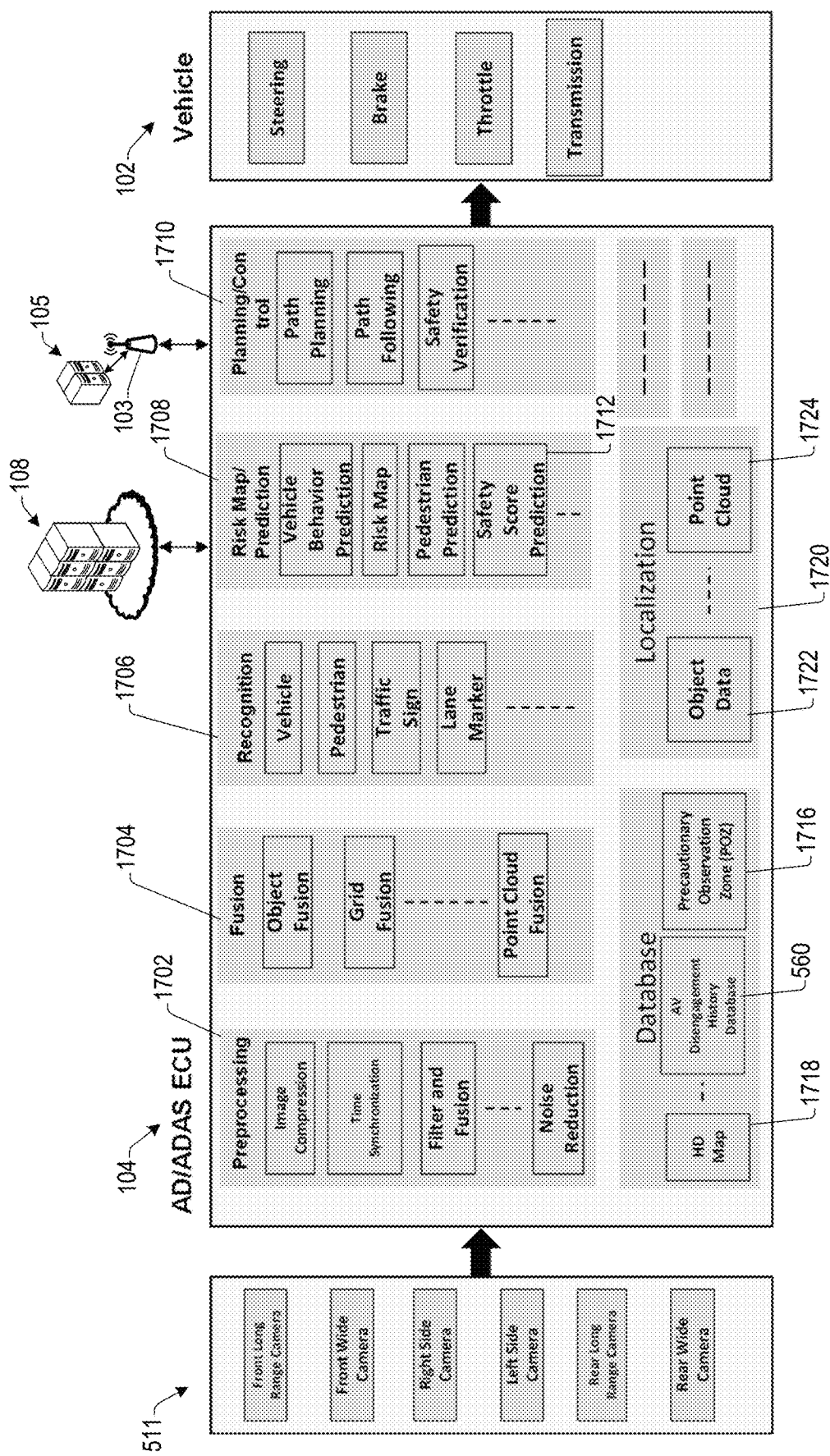
FIG. 17 illustrates an example schematic diagram of an autonomous driving control architecture according to some implementations.

FIG. 17 illustrates an example schematic diagram of an autonomous driving control architecture 1700 according to some implementations. In this example, the vehicle computing device(s) 104 discussed above with respect to FIG. 1 may include an AD ECU that may perform a plurality of different functions, such as data preprocessing 1702, fusion 1704, recognition 1706, risk map/prediction 1708, planning/control 1710, and so forth. For example, the data preprocessing 1702 may include image compression, time synchronization, filtering and fusion, noise reduction and so forth. Thus, the image compression performed in implementation herein may be one of the preprocessing 1702 sub-functions to process the raw camera image data for the automated driving system. In the examples herein, the connected vehicle cloud platform provided by the service computing devices 108 may decide the image compression method for each camera and for every road segment in advance. This information may be sent to the vehicle AD/ADAS ECU where image compression is performed for each road segment as that segment is being traversed by the vehicle.

The fusion 1704 may include object fusion, grid fusion, point cloud fusion, and the like. The recognition 1706 may include vehicle recognition, pedestrian recognition, traffic sign recognition, lane marker recognition, and so forth. The risk map/prediction 1708 may include vehicle behavior prediction, risk map generation, pedestrian prediction, and safety score prediction 1712. Furthermore, the planning/control 1710 may include path planning, path following, and safety verification.

The vehicle computing devices 104 may receive image from a plurality of cameras 511 such as a front long range camera, a front wide camera, a right side camera, a left side camera, a rear long range camera, and a rear wide camera. In addition, based at least in part on the safety score prediction 1712, the vehicle computing device 104 may control one or more components of the vehicle 102, such as steering, brakes, throttle, transmission, and the like.

In some examples, the vehicle computing device(s) 104 may control the vehicle by executing the vehicle control program inside of an AD ECU that may be included in the vehicle computing devices 104. In some cases, the roadside VEC 105 may also include an automated driving controller (e.g., may have the same capabilities as the AD ECU). If the VEC 105 has sufficient sensor coverage (e.g., infrastructure sensor data or other vehicle sensor data) to cover the entire POZ of a related road segment, as well as sufficient computing resources, the VEC 105 may utilize the automated driving control architecture, as shown in FIG. 17, to send vehicle control signals to the vehicle 102 for controlling the vehicle components for navigation of the vehicle 102 on the road segment.

Alternatively, in the case that the VEC 105 does not have sufficient sensor data to cover the entire POZ, but only the coverage for the region needed by the vehicle, VEC may utilize the preprocessing modules 1702 of the automated control architecture and send the recognition results or recognition features to the vehicle AD ECU included in the vehicle computing devices 104. The AD ECU onboard the vehicle 102 can utilize the recognition results and/or features for sensor fusion, and may identify the obstacles, road features, road anomalies, etc., that may ultimately be used for generating vehicle control signals. As another example, based on the computing requirements and available resources, the VEC 105 and the in-vehicle AD ECU may share functions (fusion, recognition, risk map prediction, localization, etc.) or other subfunctions performed to calculate the vehicle control signals for controlling the vehicle 102.

In some examples, the POZ may be used to reduce/optimize the number of sensors being used by the vehicle based on the vehicle's location. Moreover, the POZ can help to optimize the number of prediction modules to execute and the amount of sensor data to process, such as for conserving processing power which in turn can improve the vehicle efficiency. For example, in the case where the vehicle is traveling between two intersections, it may not be necessary for the vehicle to execute a pedestrian prediction motion algorithm. Numerous additional advantages and variations will be apparent to those of skill in the art having the benefit of the disclosure herein.

Furthermore, in some examples, the POZs may be calculated in the risk map/prediction 1708 as part of the safety score prediction 1712. The vehicle computing device 104 may store or access databases that may include the calculated POZs 1716, as well as map data such as an HD map 1718. Further, the vehicle computing device may store or access the AV disengagement history database 560 in some examples. Furthermore, the vehicle computing device 104 may store localization data 1720 such as object data 1722 and point cloud data 1724.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A system comprising:
one or more processors; and
one or more non-transitory computer-readable media including instructions executable by the one or more processors to configure the one or more processors to perform operations comprising:
determining a plurality of candidate routes between a source location for a vehicle and a destination location for the vehicle;
segmenting each candidate route of the plurality of candidate routes into multiple road segments;

determining, in advance of the vehicle traversing a route of the plurality of candidate routes, an observation zone for each road segment of the multiple road segments identified for each candidate route of the plurality of candidate routes;

based on the observation zone determined for each road segment, determining, in advance of the vehicle traversing a route of the plurality of candidate routes, a target to be identified at each observation zone of each road segment of each of the multiple road segments of each of the plurality of candidate routes;

determining from among a plurality of vehicle cameras of the vehicle, at least one vehicle camera operable for identifying the target at each observation zone of each road segment of each of the multiple road segments of each of the plurality of candidate routes;

determining, from among a plurality of compression methods, and for each road segment of the multiple road segments of each of the plurality of candidate routes, and based at least on the target to be identified for that road segment, a specified compression method to be utilized for compressing images captured by each camera of the plurality of vehicle cameras for enabling identification of the target at the observation zone of the road segment;

determining, for the vehicle, a selected route from the plurality of candidate routes based at least on the specified compression methods determined to be utilized for compressing the images captured by the plurality of vehicle cameras during traversal, by the vehicle, of the plurality of road segments of the selected route; and sending, to the vehicle, the selected route and the specified compression methods to be used for images captured by each camera at corresponding road segments of the multiple road segments of the selected route, wherein the vehicle utilizes the specified compression methods for compressing the images captured by the plurality of vehicle cameras during traversal of the corresponding road segments of the multiple road segments of the selected route.

2. The system as recited in claim 1, wherein, when traversing a first road segment of the selected route, the vehicle utilizes a first compression method of the plurality of compression methods for compressing images captured by a first camera of the plurality of cameras, and utilizes a second compression method of the plurality of compression methods for compressing images captured by a second camera of the plurality of cameras, wherein the first compression method is different from the second compression method.

3. The system as recited in claim 2, wherein the first compression method is a lossless compression method and the second compression method is a lossy compression method.

4. The system as recited in claim 1, wherein, when traversing a first road segment of the selected route, the vehicle utilizes a first compression method of the plurality of compression methods for compressing a first portion of an image captured by a first camera of the plurality of cameras, and utilizes a second compression method of the plurality of compression methods for compressing a second portion of the image captured by the first camera, wherein the first compression method is different from the second compression method.

5. The system as recited in claim 1, the operations further comprising:

determining, for at least one road segment of the multiple road segments of at least one of the candidate routes, and based at least on automated vehicle disengagement information obtained from a database of automated vehicle disengagement information, the target to monitor in the observation zone of the at least one road segment; and determining the specified compression methods for the at least one road segment based at least on the target determined based at least on the automated vehicle disengagement information.

6. The system as recited in claim 1, the operations further comprising:

identifying, in advance of the vehicle traversing a route of the plurality of candidate routes, and for a selected road segment of the multiple road segments of at least one of the candidate routes, a plurality of the targets in the observation zone of the selected road segment;

prioritizing the targets of the plurality of targets identified for the selected road segment based on at least one of automated vehicle disengagement information associated with respective ones of the targets identified in the observation zone for the selected road segment, or relative sizes of respective ones of the targets identified in the observation zone for the selected road segment; and specifying different compression methods for different targets of the plurality targets based at least on the prioritizing.

7. The system as recited in claim 1, the operations further comprising:

determining that computing resources on board the vehicle are not able to perform image compression associated with autonomous navigation of a selected road segment of the selected route; and scheduling one or more computing resources to assist the vehicle in autonomous navigation of the selected road segment of the selected route at a timing based on a time that the vehicle is expected to traverse the selected road segment.

8. A method comprising:

sending, by one or more processors on board a vehicle, to a service computing device over a network, a destination location and camera information related to a plurality of cameras on board the vehicle to cause the service computing device to:

determine a plurality of candidate routes between a source location for a vehicle and a destination location for the vehicle;

segment each candidate route of the plurality of candidate routes into multiple road segments;

determine, in advance of the vehicle traversing a route of the plurality of candidate routes, an observation zone for each road segment of the multiple road segments identified for each candidate route of the plurality of candidate routes;

based on the observation zone determined for each road segment, determine, in advance of the vehicle traversing a route of the plurality of candidate routes, a target to be identified at each observation zone of each road segment of each of the multiple road segments of each of the plurality of candidate routes;

determine from among the plurality of vehicle cameras of the vehicle, at least one vehicle camera operable for identifying the target at each observation zone of each road segment of each of the multiple road segments of each of the plurality of candidate routes;

determine, from among a plurality of compression methods, and for each road segment of the multiple road segments of each of the plurality of candidate routes, and based at least on the target to be identified for that road segment, a specified compression method to be utilized for compressing images captured by each camera of the plurality of vehicle cameras for enabling identification of the target at the observation zone of the road segment;

determine, for the vehicle, a selected route from the plurality of candidate routes based at least on the specified compression methods determined to be utilized for compressing the images captured by the plurality of vehicle cameras during traversal, by the vehicle, of the plurality of road segments of the selected route; and send, to the vehicle, the selected route and the specified compression methods to be used for images captured by each camera at corresponding road segments of the multiple road segments of the selected route;

receiving, by the one or more processors, from the service computing device, routing information indicating the selected route including the multiple road segments for autonomously driving the vehicle to the destination location, and further receiving the specified compression methods to be utilized for images captured by each camera during traversal of corresponding ones of the road segments; and during navigation of the vehicle along a first road segment of the plurality of road segments of the selected route, utilizing, by the one or more processors, a first specified compression method for compressing images received from a first camera of the plurality of cameras, wherein the first compression method was specified by the service computing device to be utilized for compressing images of the first camera during traversal of the first road segment.

9. The method as recited in claim 8, wherein the vehicle includes a second camera, and the specified compression methods include a plurality of different compression methods, the method further comprising:

utilizing a second compression method that is different from the first compression method for compressing images captured by the second camera while the vehicle is navigated along the first road segment of the selected route.

10. The method as recited in claim 9, further comprising, during navigation of the vehicle along a second road segment of the selected route, utilizing a third compression method for compressing images captured by the first camera while the vehicle is navigated along the second road segment, wherein the third compression method is different from the first compression method and the second compression method.

11. The method as recited in claim 9, wherein the first compression method is a lossless compression method and the second compression method is a lossy compression method.

12. The method as recited in claim 8, further comprising:

receiving, by the vehicle, while the vehicle is traversing the route, and from a computing device that is associated with a road segment of the selected route, information including at least one of image information corresponding to the road segment or recognition information corresponding to the road segment; and employing the information received from the computing device, at least in part, for navigating of the road segment.

13. The method as recited in claim 8, wherein the specified compression methods to be utilized during traversal of corresponding ones of the road segments is based at least in part on information related to past disengagement of an automated vehicle at a road segment included in the plurality of road segments of the selected route and obtained from a database of automated vehicle disengagement information accessed by the service computing device.

14. The method as recited in claim 13, wherein the specified compression methods to be utilized during traversal of corresponding ones of the road segments is based at least in part on the observation zones determined for the respective road segments and respective targets for recognition determined in respective observation zones based at least on the information related to the past disengagement.

15. A method comprising:

determining, by one or more processors, a plurality of candidate routes between a source location for a vehicle and a destination location for the vehicle;

segmenting each candidate route of the plurality of candidate routes into multiple road segments;

determining, in advance of the vehicle traversing a route of the plurality of candidate routes, an observation zone for each road segment of the multiple road segments identified for each candidate route of the plurality of candidate routes;

based on the observation zone determined for each road segment, determining, in advance of the vehicle traversing a route of the plurality of candidate routes, a target to be identified at each observation zone of each road segment of each of the multiple road segments of each of the plurality of candidate routes;

determining from among a plurality of vehicle cameras of the vehicle, at least one vehicle camera operable for identifying the target at each observation zone of each road segment of each of the multiple road segments of each of the plurality of candidate routes;

determining, from among a plurality of compression methods, and for each road segment of the multiple road segments of each of the plurality of candidate routes, and based at least on the target to be identified for that road segment, a specified compression method to be utilized for compressing images captured by each camera of the plurality of vehicle cameras for enabling identification of the target at the observation zone of the road segment;

determining, for the vehicle, a selected route from the plurality of candidate routes based at least on the specified compression methods determined to be utilized for compressing the images captured by the plurality of vehicle cameras during traversal, by the vehicle, of the plurality of road segments of the selected route; and sending, to the vehicle, the selected route and the specified compression methods to be used for images captured by each camera at corresponding road segments of the multiple road segments of the selected route, wherein the vehicle utilizes the specified compression methods for compressing the images captured by the plurality of vehicle cameras during traversal of the corresponding road segments of the multiple road segments of the selected route.

16. The method as recited in claim 15, wherein, when traversing a first road segment of the selected route, the vehicle utilizes a first compression method of the plurality of compression methods for compressing images captured by a first camera of the plurality of cameras, and utilizes a second compression method of the plurality of compression methods for compressing images captured by a second camera of the plurality of cameras, wherein the first compression method is different from the second compression method.

17. The method as recited in claim 15, wherein the first compression method is a lossless compression method and the second compression method is a lossy compression method.

18. The method as recited in claim 15, wherein, when traversing a first road segment of the selected route, the vehicle utilizes a first compression method of the plurality of compression methods for compressing a first portion an image captured by a first camera of the plurality of cameras, and utilizes a second compression method of the plurality of compression methods for compressing a second portion of the image captured by the first camera, wherein the first compression method is different from the second compression method.

19. The method as recited in claim 15, further comprising determining, for at least one road segment of the multiple road segments of at least one of the candidate routes, and based at least on automated vehicle disengagement information obtained from a database of automated vehicle disengagement information, the target to monitor in the observation zone of the at least one road segment; and determining the specified compression methods for the at least one road segment based at least on the target determined based at least on the automated vehicle disengagement information.

20. The method as recited in claim 15, further comprising:

identifying, in advance of the vehicle traversing a route of the plurality of candidate routes, and for a selected road segment of the multiple road segments of at least one of the candidate routes, a plurality of the targets in the observation zone of the selected road segment;

prioritizing the targets of the plurality of targets identified for the selected road segment based on at least one of automated vehicle disengagement information associated with respective ones of the targets identified in the observation zone for the selected road segment, or relative sizes of respective ones of the targets identified in the observation zone of the selected road segment; and specifying different compression methods for different targets of the plurality targets based at least on the prioritizing.

* * * * *